United States Patent [19]
Taylor

[11] Patent Number: 5,197,279
[45] Date of Patent: Mar. 30, 1993

[54] ELECTROMAGNETIC ENERGY PROPULSION ENGINE

[76] Inventor: James R. Taylor, 1907 May Cir., Fultondale, Ala. 35068

[21] Appl. No.: 847,684

[22] Filed: Mar. 6, 1992

Related U.S. Application Data

[63] Continuation-in-part of Ser. No. 459,441, Jan. 2, 1990, abandoned.

[51] Int. Cl.$^5$ ............................................. F03H 5/00
[52] U.S. Cl. ................................. 60/203.1; 60/200.1
[58] Field of Search ...................... 60/200.1, 201, 202, 60/203.1

[56] References Cited

FOREIGN PATENT DOCUMENTS 1586195  2/1970  France .
2036646 12/1970  France .
58-32976(A) 2/1983 Japan .

OTHER PUBLICATIONS

*Megagauss Fields*, by J. G. Linhart, Physics Today, Feb. 1966, pp. 37–42.
*Static and Dynamic Electricity*, by W. R. Smythe, McGraw-Hill Book Company, Inc., New York, New York, 1950, pp. 447 and 448.
*Principles of Electricity and Electromagnetism*, by G. P. Harnwell, 2nd Edition, McGraw-Hill Book Company, Inc., New York, New York, 1949, pp. 572–579.
*Introduction to Modern Physics*, by Richtmyer and Kennard, 4th Edition, McGraw-Hill Book Company, Inc., New York, New York, 1947, pp. 58–61 and 146–149.
*Electromagnetic Fields, Energy and Forces*, by Fano, Chu and Adler, John Wiley and Sons, Inc., New York, New York, pp. 421–425.
*The Feynman Lectures on Physics*, by Feynman, Leighton & Sands, Addison-Wesley Publishing Co, New York, N.Y., pp. 17-5 to 17-6, 27-9 to 27-11, 34-10 to 34-11.
*McGraw-Hill Encyclopedia of Science and Technology*, McGraw-Hill Book Co. Inc., New York, New York, 1977, vol. 8, pp. 626–629.
*Superconducting Magnets*, by Martin Wilson, published by Oxford University Press, second edition, 1989, p. 3.
*Materials and Techniques for Electron Tubes*, by Walter H. Kohl, Reinhold Publishing Corporation, NY, NY, 1962, pp. 92, 93, 109, 114, 115.

Primary Examiner—Louis J. Casaregola
Attorney, Agent, or Firm—Jacobson, Price, Holman & Stern

[57] ABSTRACT

An electromagnetic energy propulsion engine system including a hollow housing having a front part (50) and a rear end part (4) of material transparent to the passage of electromagnetic fields, electromagnetic field generating solenoidal windings (23), (25), having central axes parallel with the central axis of the engine and axially spaced from each other to provide a forward field generating winding (25) and a rear field generating winding (23), a power source (44), a control computer (42), and a power pulse generator (40) connected between the electromagnetic field generating windings and the power source and control computer. The forward field generating winding generates a rearwardly directed magnetic field toward the rear wall parallel to the central axis, and the rear field generating winding produces a forwardly directed magnetic field opposing the rearwardly directed magnetic field of the forward field generating winding so that the rearwardly directed magnetic field repels forwardly directed pulses of the rear magnetic generating winding. As the electrical current conduction in the rear field generating winding suddenly reduces, the continuing rearwardly directed magnetic field force transmits pulsating magnetic field energy produced by the rear field generating winding through the rear of the housing. The reaction to the rearwardly transmitted field energy produces a thrust propelling the engine and a vehicle in which it is mounted.

26 Claims, 20 Drawing Sheets

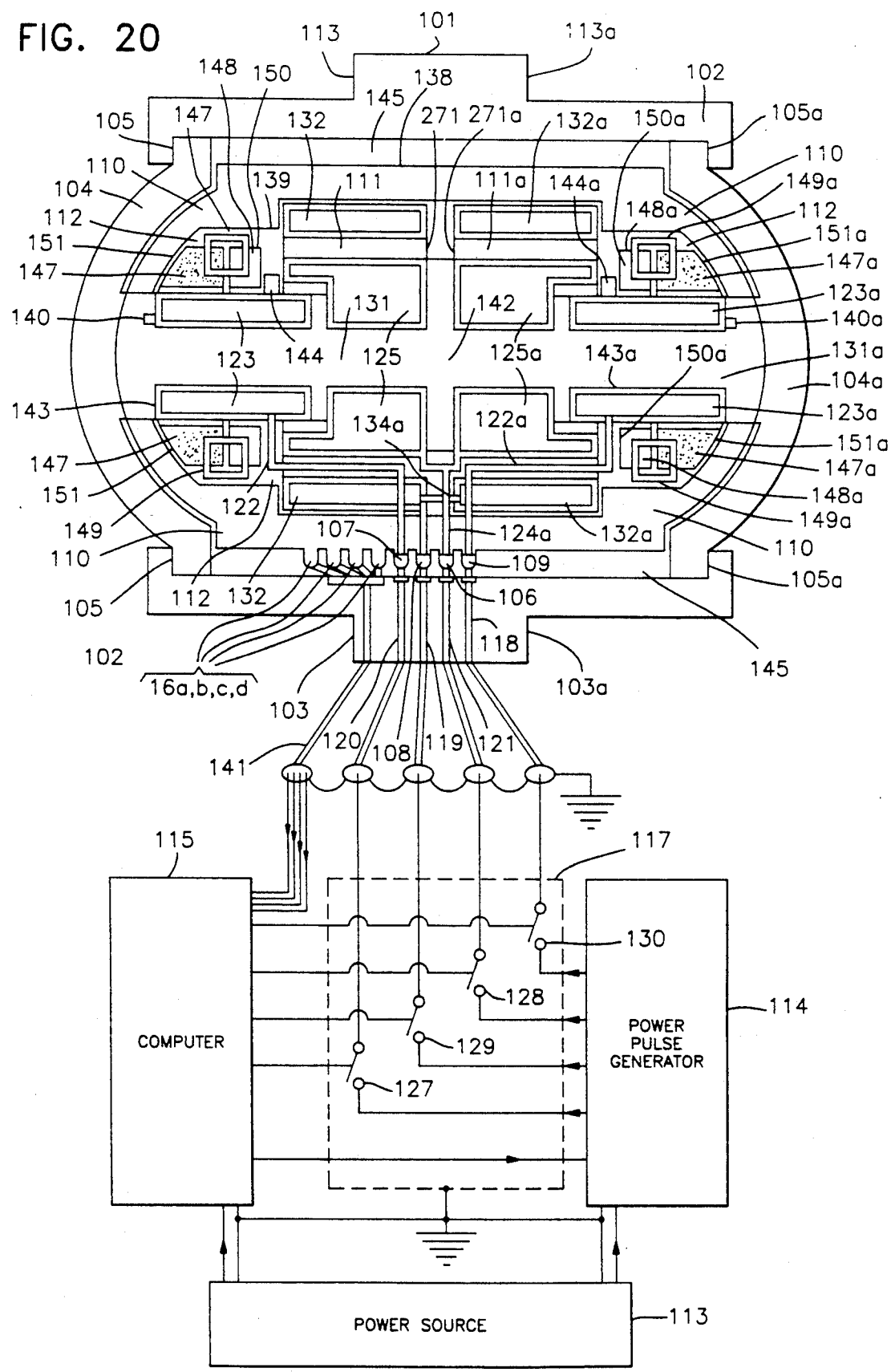

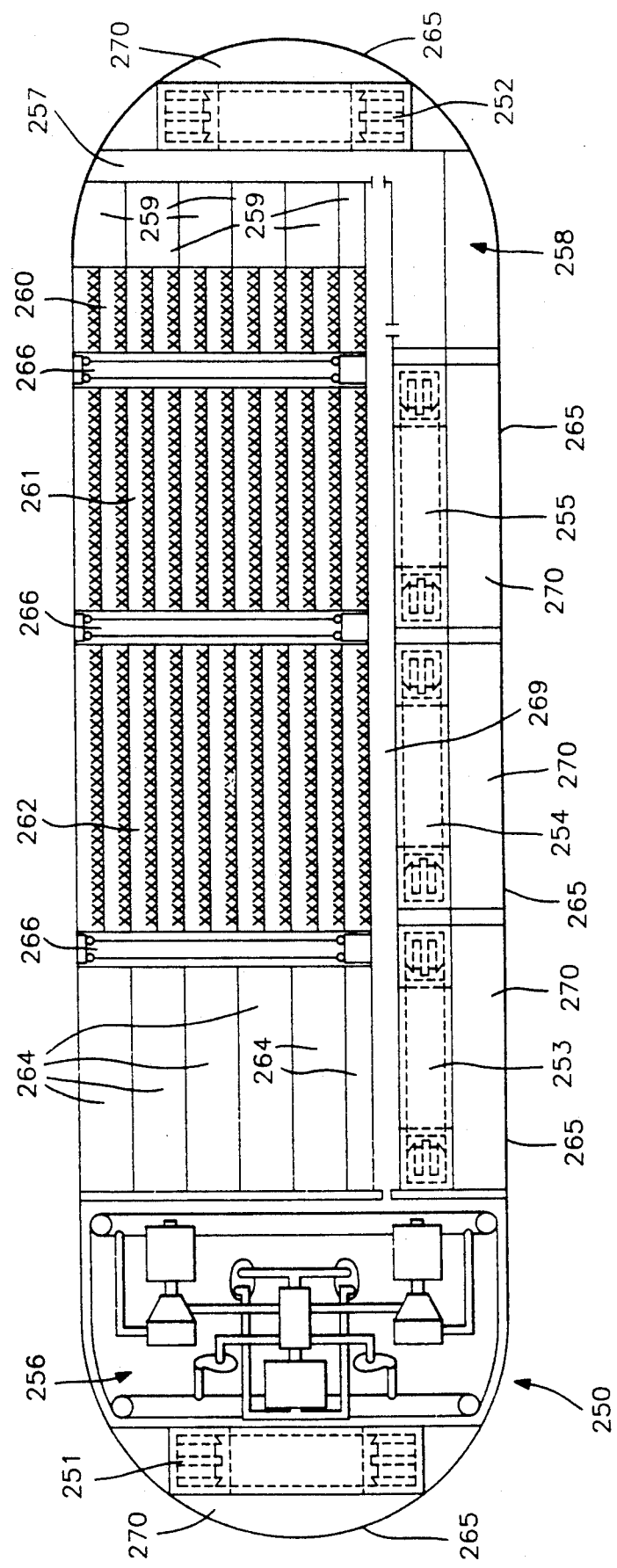

ELECTROMAGNETIC ENERGY PROPULSION ENGINE

This application is a continuation-in-part of U.S. patent application Ser. No. 07/459,441, filed Jan. 2, 1990 (abandoned) in the name of James Robert Taylor.

BACKGROUND OF THE INVENTION

The present invention relates to apparatuses and methods for the production of electromagnetic fields and for interrupting and controlling such fields, and to the production of such fields for propelling an object.

It is known to use electromagnetic fields for the purpose of propelling an object as shown in Japanese patent document JP-A-58 32976 and French patent documents FR-A-1,586,195 and FR-A-2,036,646. However these teach only making use of conventional methods of electromagnetic radiation such as those normally used in radio transmissions. In addition, the Japanese patent document concerns the impingement upon and the reflection from solid surfaces of conventional electromagnetic photon radiation as a means of gaining propelling force on an object.

These prior art patent documents are incorporated herein by reference and all show the use of well known electromagnetic radiation principles of radio, radar, and television in which the only electromagnetic energy that is emitted is in the form of large numbers of photons that radiate outwardly from their source electrons as individually propagating energy packets. Although the Japanese patent document describes the production of strong magnetic fields, there is no teaching of how such magnetic fields are propelled away from the vehicle in which they are generated, and therefore there is no propelling force generated from the vehicle. The only electromagnetic energy that propagates away from the vehicle exists in the form of photons which irradiate into space by spraying from a wave guide against the concave surface of a parabolic member from which they are reflected to pass through pulsing high-frequency magnetic fields. Alternatively, photons are generated when free electrons in conductors are caused to be either accelerated or decelerated in the process of producing strong magnetic field pulses.

Both of the French patent documents show generation of strong magnetic fields, but do not demonstrate any method or means by which such fields are separated from their generators or propagated through space. There is therefore no propelling force produced by the electromagnetic fields. The only electromagnetic energy that departs from the vicinity from either of the French devices exists in the form of photons that are radiated into space, the photons being generated in the acceleration or deceleration of free electrons used to produce the electromagnetic field pulses of the inventions.

The theory and use of electromagnetic energy is also shown in the following publications: *Static and Dynamic Electricity*, by W. R. Smythe, McGraw-Hill Book Company, Inc., New York, New York, 1950, pages 447 and 448; *Megagauss Fields*, by J. G. Linhart, *Physics Today*, February 1966, pages 37-42; *Introduction to Modern Physics*, by Richtmyer and Kennard, 4th Edition, McGraw-Hill Book Company, Inc., New York, New York, 1947, pages 58-61 and 146-149; *Principles of Electricity and Electromagnetism*, by G. P. Harnwell, 2nd Edition, McGraw-Hill Book Company, Inc., New York, New York, 1949, pages 572-579; *Electromagnetic Fields, Energy and Forces*, by Fano, Cheu and Adler John Wiley and Sons, Inc., New York, New York, pages 421-425; *The Feynman Lectures on Physics*, by Feynman, Leighton & Sands, Addison-Wesley Publishing Co, New York, N.Y., pages 17-5 to 17-6, 27-9 to 27-11, 34-10 to 34-11. The theory of magnetic relaxation cooling is described in the *McGraw-Hill Encyclopedia of Science and Technology*, McGraw-Hill Book Co. Inc., New York, New York, 1977 Volume 8, pages 44-45. These publications are also incorporated herein by reference.

BRIEF SUMMARY OF THE INVENTION

It is an object of the invention to provide an engine for producing electromagnetic energy which is used to propel a vehicle.

It is a further object of the invention to provide an engine for imparting momentum to a vehicle by generating and transmitting in predetermined directions massive quantities of electromagnetic field energy in successive pulses.

It is a still further object of the invention to provide an engine for imparting momentum to a vehicle by transmission of electromagnetic field energy in accordance with the slingshot principle wherein powerful repelling forces are first produced between opposing electromagnetic fields, produced by a forward generator generating a field in a rearward direction and a rear generator generating a field in a forward direction, the rearwardly directed field acting on and transmitting away from the vehicle the forwardly directed electromagnetic field when the rear field generator superconducting current suddenly ceases flowing, resulting in a reaction upon the engine and its associated vehicle due to the tra.ismission of electromagnetic field pulse energy of several kilograms mass at high velocity to provide thrust to the vehicle.

These objects are accomplished by the invention wherein electromagnetic field generators are mounted and affixed within a succession of chambers, the chambers being mounted in a more or less cylindrical enclosure of varying diameter circular cross section, a front generator being affixed toward the front end of the enclosure while the rear magnetic generator is affixed with the front magnetic generator on a common winding form of magnetically transparent material having good mechanical strength, the two generators being more or less cylindrical and circular in configuration and having a common axis that is more or less coincident with that of the enclosure. The enclosure makes use of magnetic shield materials on its forward walls that shield the regions adjacent the front wall, thereby minimizing the passage through those members of magnetic fields. The rear wall of the enclosure about the engine is constructed of materials that are highly transparent to the passage of magnetic field lines of force. The structure is constructed and assembled so that it may be pressurized and adapted for the input of control signals, the containment of liquid gases at low temperatures and the containment of magnetic refrigeration devices.

Although the above referred to prior art apparatuses make use of interrupted or pulsed electromagnetic fields, each depends on the radiation of electromagnetic field pulses of high frequency alternating currents similar to those that have been transmitted by backward-looking radars of conventional aircraft for several decades. The operation of the engine of the instant invention makes use of time dependent direct current flows to produce the pulses of massive electromagnetic field energy and transmit them into the adjacent space, as distinguished from the frequency dependent current flows of the above prior art.

The principles and materials of superconductivity are utilized in the engine of this invention both to generate the massive pulses of electromagnetic field energy that are transmitted to produce the thrust, and to turn off one of the two opposing electromagnetic field generators so that the other active forward position field generator will transmit in a rearward direction the massive quantity of energy generated in each pulse by the rear field generator, the critical magnetic field intensity for which is exceeded at the peak of each pulse.

The vehicles which ar propelled by the engine of the invention may be air foil configured composite housings made of different parts that are assembled together as depicted in some of the drawings. The housings contain means for generating several megawatts of electrical power, means for processing, distributing and controlling the electrical power, means for generating high power direct current initiating pulses of electrical energy for operating the propulsion engine, computer means for controlling the operation, thrust and flight of the vehicles, means for providing propulsion for the vehicles, means for utilizing liquid helium, and means for accommodating a crew and passengers in the vehicles.

Associated and integral with the propulsion engine assembly is a magnetic refrigeration system used for removing thermal energy generated in the electrical conductors during the course of operation of the engine. Also provided external to the engine are a high energy electrical power source, a power pulse generator and an electronic control system computer that provides programmed control pulses of electric current to torodial control windings that are wound about the solenoid windings of each of the field generators. In the operation of the engine, intense magnetic fields in the form of magnetic field energy are first generated by the rear engine and then caused to be transmitted from the rear of the propulsion engine by the repelling force of the forward field generator, thereby providing pulses of forward thrust to the propulsion engine assembly.

In accordance with the present invention methods, materials and apparatuses are provided for the purpose of producing propulsion of vehicles under a range of conditions and in several environments. The invention is intended to provide propulsion for vehicles that fly in the earth's atmosphere as well as in outer space, and also to provide propulsion for vehicles that move in other environments. An engine in accordance with the invention uses highly intensive electromagnetic fields produced by superconducted electric and magnetic currents flowing in its coils.

A further embodiment of the invention provides an engine constructed of a high strength cylindrical housing of ferromagnetic materials, its two ends being enclosed by circular windows constructed of a material, such as high alumina ceramic, that are transparent to the passage of electromagnetic fields. A winding core of similar high alumina ceramic material is provided integral with the two end windows. Four solenoidal field generator windings are mounted concentric with and along a ceramic core, including two continuously operating main field generator solenoidal windings mounted in the center and one pulsed field generator solenoidal winding mounted adjacent to and toward each end of the ceramic core, respectively, relative to the centrally mounted main field generator winding. Concentric with and surrounding each of the centrally mounted main field generator solenoidal windings are mounted field generator solenoidal windings that are parallel with and inside the ferromagnetic housing. Each of the solenoidal windings of the six field generators is provided with an additional coil wound toroidally about it for use in initiating and otherwise influencing the electric and magnetic current flow in the six solenoidal windings. The six solenoidal and six toroidal windings are all constructed of specially designed and fabricated superconducting materials.

Associated with the engine and mounted external to the engine are a number of auxiliary items of equipment, including a primary power source, a power transducer, a power pulse generator, a control computer, and a switching panel, all with appropriate connecting cables to transport the electrical energies.

Primary electrical energy for operation of the engine and its associated equipment comes from an external primary power supply that provides electrical energy to the vehicle upon which the engine is mounted. The primary power supply is chosen to supply the amount of energy needed to operate the flying vehicle and its life support systems, if any, as well as to supply electrical power to the engine. Typically, in a space flight application such a primary electrical energy source could make use of a nuclear reactor capable of supplying heat energy in the kilowatt to megawatt range, the heat energy being converted by use of a Rankine cycle system. Preferably, a fissioning nuclear reactor of the heterogeneous type using low temperature moderators would be used as the primary energy source.

The purpose of the propulsion engine of this invention is to provide solutions to a number of problems with existing engines of other types that provide propulsion to vehicles, such as noise, overflights, large take-off runway lengths, and limited velocities in flight, as well as distance restrictions to flight. The propulsion engine of the invention transmits magnetic fields in pulses from the rearward end of the engine, thereby providing for flight velocities that are appreciable compared to the velocity of light. As such, the purpose of the propulsion engine of this invention is to propel vehicles in space, through the atmosphere of planets, and other media, and by doing so to assist in solving several problems that result from existing propulsion systems.

Via its mountings the propulsion engine of the invention can transfer thrust to a wide variety of vehicle configurations, thereby providing propulsion for the vehicles in their respective modes of travel. Major benefits that will be gained by the use of the propulsion engine of the invention on flying vehicles are the reduction of noise, the cessation of use of fossil fuels with their consequent emission of carbon dioxide into the atmosphere, the reduction in area required for landing and take off, removal of fear from people living in the flight paths of conventional aircraft and shortening of time required for long distance travel by enabling the flying vehicles to combine short vertical flights in the atmosphere with longer distance high velocity tangential flights through space above the atmosphere. By converting energy from its primary power source, the engine of this invention will make it unnecessary to transport large volumes and masses of fuel since the fuel used will be the electromagnetic energy contained in the pulses of magnetic fields.

The invention, provides a propulsion engine that produces its own fuel in the form of pulses of magnetic energy fields that exist as independent regions of intense curvature in that part of the space-time continuum existing inside the engine housing prior to their transmission to gain thrust.

The present invention works by imparting momentum to pulses of intense electromagnetic field energy using the slingshot principal to separate the fields of energy that are principally not composed of photons from their generator and to eject into adjacent space the pulses of electromagnetic energy in the form of a succession of independent fields, the reactions upon the engine from imparting momentum to the pulses of electromagnetic field energy thereby achieving propulsion of the engine and any vehicle attached thereto.

The slingshot action is achieved by producing a increasingly strong repelling force built up between the opposing electromagnetic fields of two solenoid wound electromagnetic field generators, the electric and magnetic currents generating one of the two fields being caused by design to cease flowing at the predetermined peak of the build up of opposing forces. At the same time as the magnetic and electric current flows cease in one of the two opposing electromagnetic field generators, a pulse of potential having the polarity needed to inhibit reversed electric and magnetic current flow in the now ceased electromagnetic field generator is applied to that field generator in which current flows have ceased. In this manner the continuing and opposing electromagnetic field force is aided in repelling an ejecting or transmitting the pulse of the intense electromagnetic field energy of the ceased field generator away from its generating coil and into the adjacent space outside the engine assembly.

Although the use of interrupted or pulsed electromagnetic fields is shown in the above prior art, only the present invention uses the slingshot method for imparting momentum to electromagnetic fields that are largely composed of non-photonic electromagnetic energy. The use of pulses of electromagnetic energy composed of large numbers of individual photons in the form of conventional radiation from accelerated free charges, as in the three patent documents noted above, has been shown to convey only minuscule amounts of momentum to the photons, and hence thrust to the devices that project the photons into space. These teachings, therefore, do not represent effective methods for achieving significant amounts of vehicle propulsion. French patent FR-A-1,586,195 concerns the use of superconductivity to enhance the level of flow of free electrons for the purpose of producing electromagnetic fields from greater quantities of photons; however the use of superconductivity to increase the amounts of currents that will flow in a conductor in order to produce more intense electromagnetic fields has been practiced for many decades. French patent FR-A-2,036,646 makes use of Ferroxcube material to reduce the reluctance of magnetic paths for the purpose of increasing magnitudes of current flows thereby increasing the quantities of photons that are produced; however the use of Ferroxcube material for such purposes has been in use for enhancing current flows for several decades.

BRIEF DESCRIPTION OF THE DRAWINGS

The invention will be described in greater detail with reference to the accompanying drawings wherein:

FIG. 8b is a perspective view of one of the four segments of the inner support members which cooperate with the outer support member of FIG. 8a;

FIG. 20 is a schematic cross-sectional view similar to FIG. 17 and further showing the location of the components of the engine and manner of connection via transformers to the external equipment that supply controlled electronic power initiation and control pulses to the engine;

FIG. 25 is a schematic cross-sectional view of a further embodiment of the invention.

DETAILED DESCRIPTION OF PREFERRED EMBODIMENTS

A number of the features of the invention may be varied and still obtain the pulses of thrust due to the transmission from the engine enclosure of pulses of magnetic field energy through the rear of the engine. Embodiments of the invention for achieving the controlled pulses of forward thrust from rapid transmission from the engine enclosure of pulses of magnetic field energy through the rear of the engine will now be described.

Figure 5:
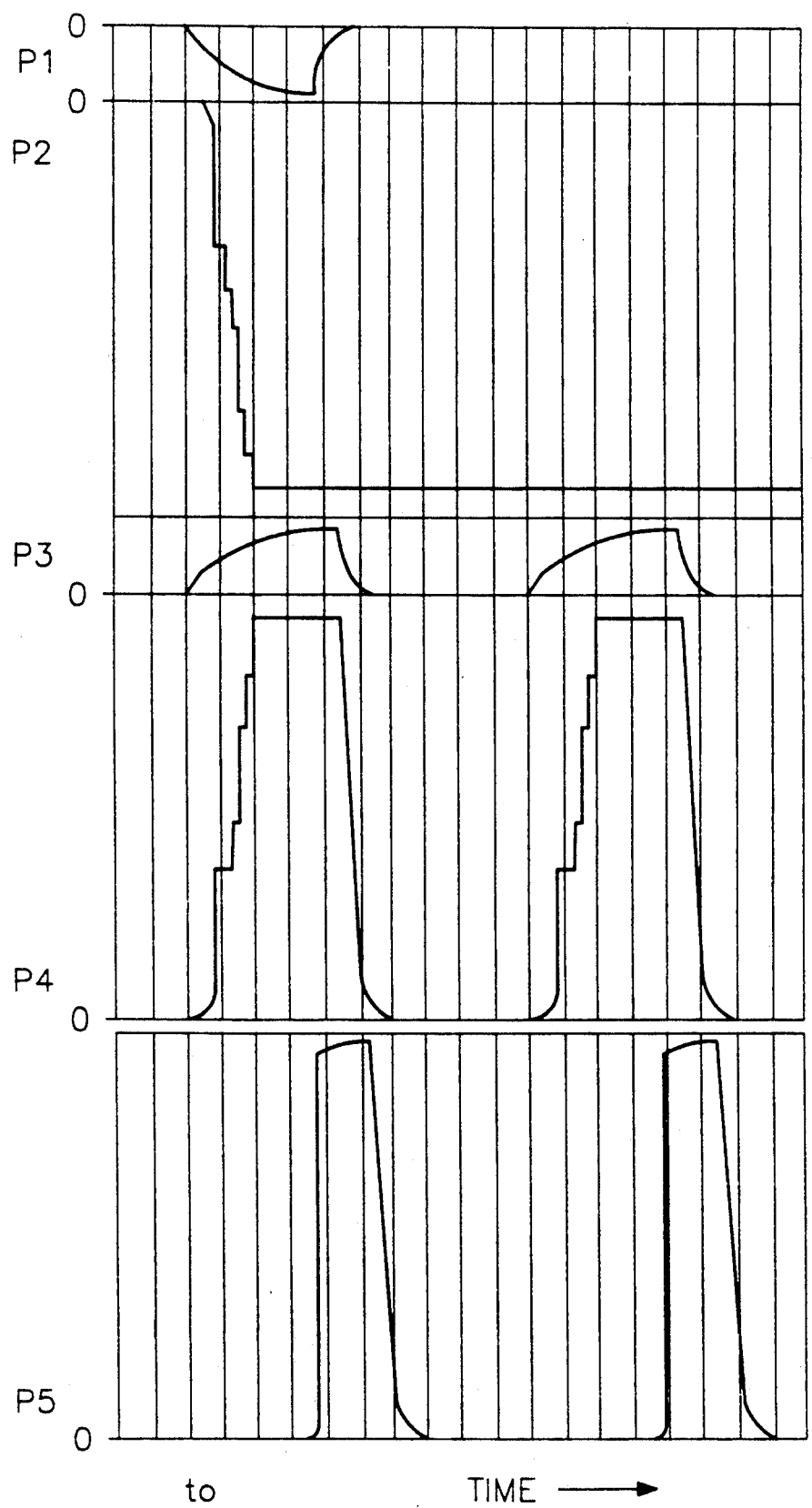
FIG. 5 is a graph showing the sequence of pulses used to initiate and terminate the superconducting states of the superconductors in those variations of the rear and front mounted field generators depicted in the invention. Also shown are the respective electric current pulses generated by the front mounted and by the rear mounted field generators and the pulse of thrust generated once each cycle of operation of the propulsion engine.
Figure 6:
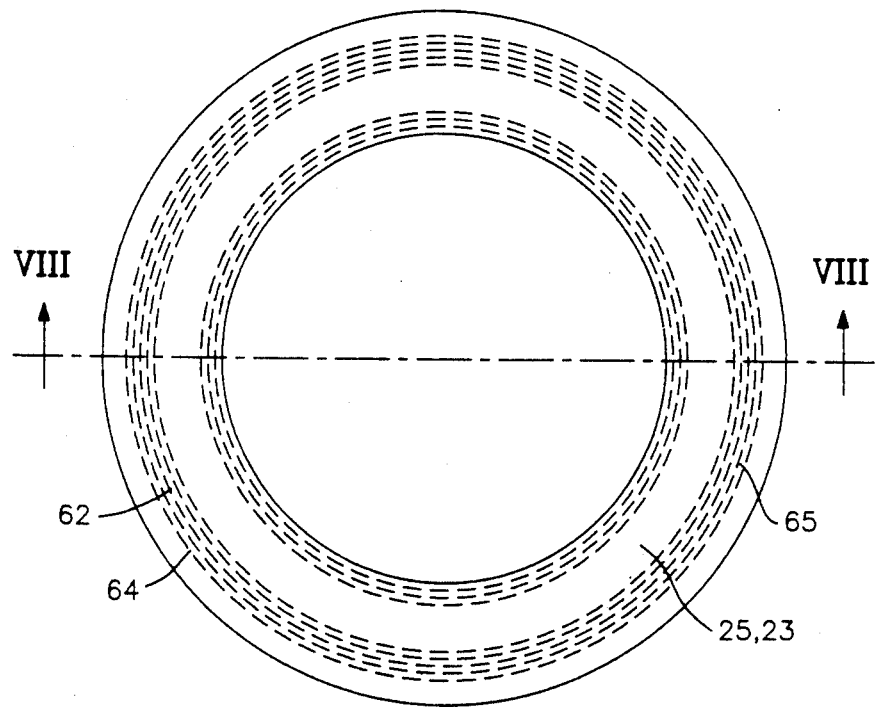
FIG. 6 is a view similar to FIG. 1 of another embodiment of the invention.

Referring to the form of the invention shown in FIGS. 1 through 4 and to FIG. 5 for the electric current pulses and forward thrust pulses, a housing constructed of front walls 1a, side walls 1b, and rear wall 4 is shown, the front walls 1a and cylindrical side walls 1b being constructed of two halves that are joined during assembly along line 2, the rear wall 4 being one piece of material and being joined to the assembled side walls 1b along line 5 by suitable means such as screw-threaded fasteners (not shown). In the form shown the front walls 1a and side walls 1b are constructed of layered materials, the inside layer 32 consisting of material that is capable of guiding magnetic field lines of force along its surfaces, the outer layer consisting of magnetic shield material capable of minimizing the transmission through it of magnetic fields and having high mechanical strength and low magnetic reluctance, such as a suitable steel, for example. The rear wall 4 is constructed of an electrically nonconducting material, such as high alumina porcelain that is capable of permitting the transmission of magnetic fields through it to the outside of the engine housing. Threaded bolt holes 3 are provided for joining the propulsion engine assembly onto a vehicle to which the engine transmits pulses of thrust during its operation.

The combined structure of the high alumina porcelain engine support ring 6, the high alumina porcelain liquid gas shroud 8, the high alumina porcelain low temperature liquid gas vessel 10, the high alumina porcelain thrust impact anvil 14, the impact pad 19 and the engine housing walls 1a and 1b is such that when assembled they serve together to resist and contain the repulsive force generated by the opposing magnetic fields of the two magnetic field generators during the operation of the engine. Ceramic spacer rings 13 and 13a serve to determine the distance between the rear field generator containing coils 22 and 23 and the front field generator containing coils 24 and 25.

The liquid gas shroud has front and rear indexing rings, rear index ring 17 being caused at assembly to protrude into index cavity 7 of support ring 6 when front index ring 18 protrudes into and indexes with location cavity 15 in impact anvil 14. Magnetic refrigeration chamber 16 is essentially cylindrical and is positioned in the region between the outer periphery of the liquid gas shroud 8 and the inner surface 32 of the engine side walls 1b.

The liquid gas in chamber 11 of the liquid gas vessel 10 cools the superconducting electrical current coils 23 and 25 having superconducting members 27 and 29, respectively, of the front magnetic field generator and the rear magnetic field generator to the same superconducting temperature. The liquid gas vessel 10 is enclosed within liquid gas shroud 8, containing liquid gas at a somewhat higher temperature in shroud chamber 9 than the temperature of the liquid gas contained in chamber 11 of vessel 10.

Conventional windings 26a and 28a are wound toroidally around superconducting members 27 and 29, respectively, and have the purpose of initiating current flow in the superconductors. Conventional windings 26 and 28 are wound so as to aid in terminating electric current flow in the superconductors 27 and 29, respectively. Windings 26 and 28 may be operated in conjunction with or independent of windings 26a and 28a.

The superconducting materials that comprise the front superconducting field generator members 29 are either specially formulated in manufacture or are specially selected so that they have a critical magnetic field intensity at which they will drop out of superconduction that is marginally higher in intensity than the critical magnetic field intensity that is required to cause the superconducting members 27 of the rear magnetic field generator coil 23 to drop out of superconduction, the temperature of the two superconducting field generator coils 23 and 25 being the same and the magnitudes of the electric currents flowing in them during superconduction being such as to give the high repelling forces required to yield usable levels of thrust when the field intensity internal to the engine housing is rapidly reduced by being ejected or transmitted from the rear of the housing. During normal use region 12 inside the engine housing is filled and pressurized with a spark quenching gas, such as sulfur hexafluoride.

Figure 3:
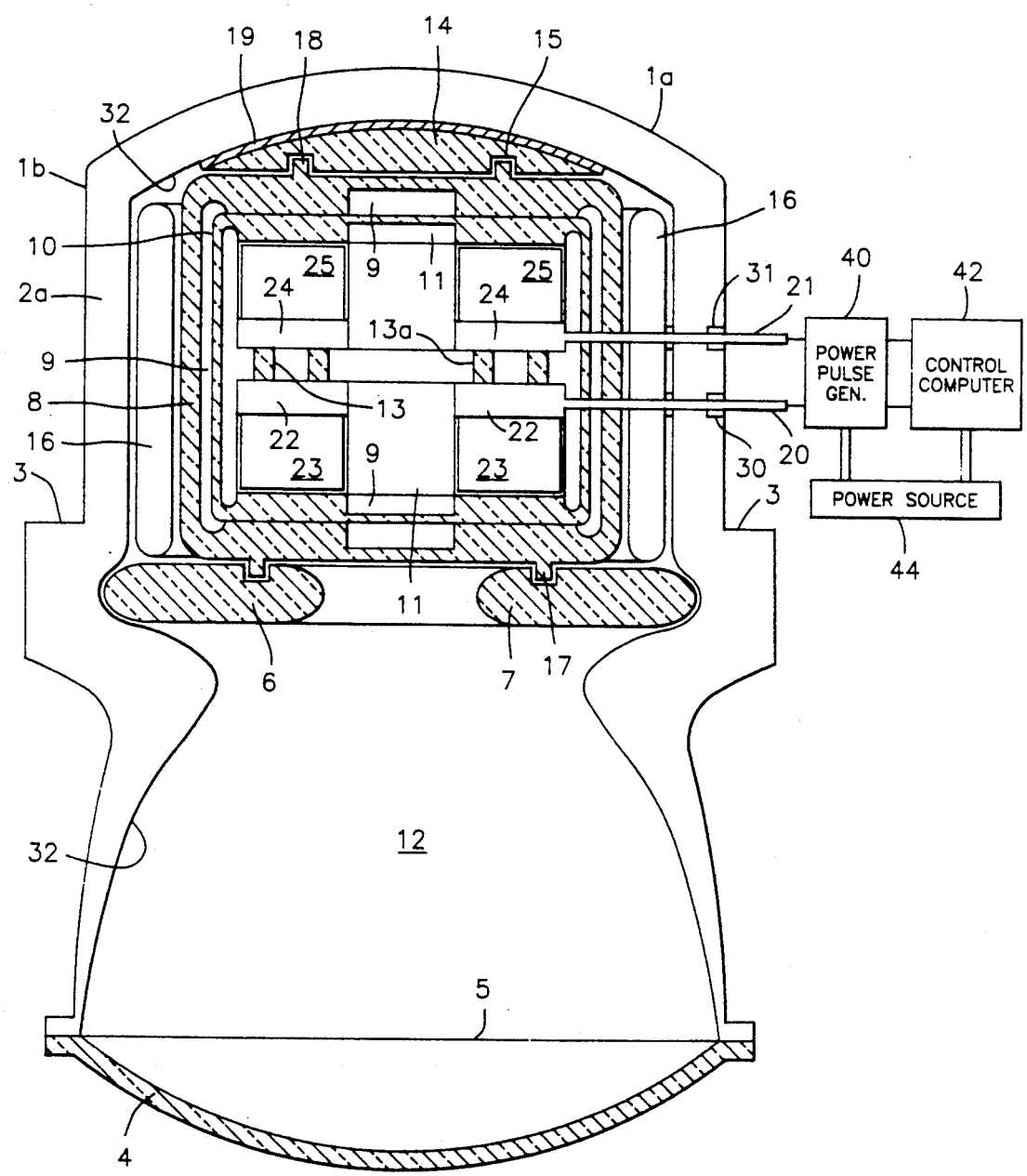
FIG. 3 is a cross-sectional view taken along line III—III of FIG. 1, showing the propulsion engine assembly consisting of two magnetic field generators mounted inside th engine enclosure with a magnetic refrigeration system operated from the pulses of magnetic field energy generated by the two field generators.
Figure 4:
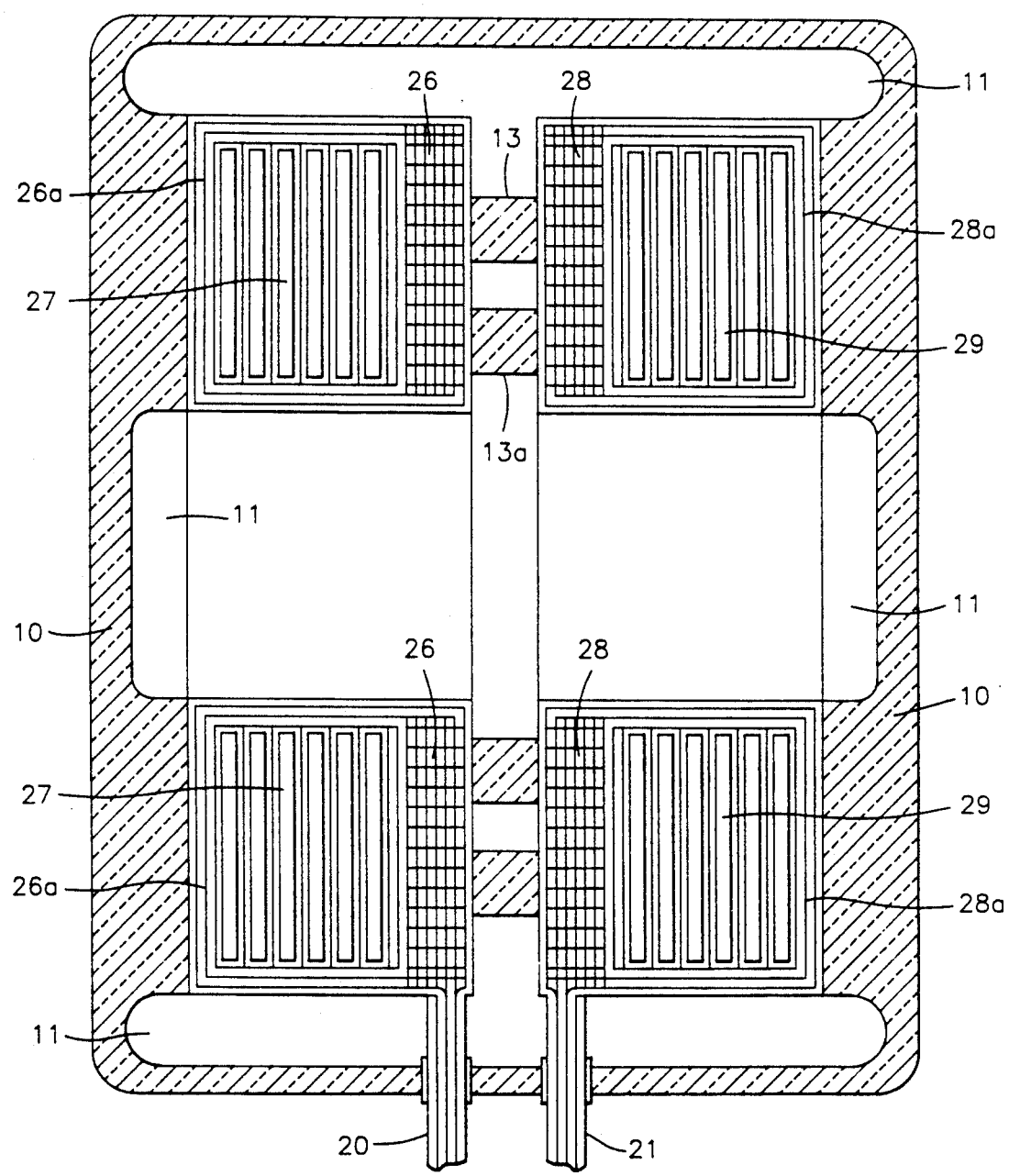
FIG. 4 is an enlarged cross-sectional view of the two magnetic field generators mounted inside their liquid gas vessel and minus the shroud, the anvils of the liquid gas vessel being shown pressing against the outer ends of the cylindrical field generators to restrain them from outward movement, each field generator consisting of contiguous, but independent electromagnetic field generating coils, the independent coils comprising those that are constructed of multiple turns of a conventional electric current conductor material such as copper and those members that are comprised of multiple independent circular loops of superconducting materials such as Type II superconductors.

In the operation of the engine the associated electronic equipment shown generally in FIG. 3 as a power pulse generator 40, control computer 42 and power source 44, for example, supplies drive pulses P1 via the rear generator control cables 21 to conductors 28a of coil 24. The rising electric current flowing in toroidal windings 28a of coil 24 cause superconducting electric current to begin flowing in superconducting coil 25, the electric currents in windings 28a being caused to flow in a direction such that its magnetic field is directed toward the rear of the engine. Once established, the superconducting electric currents continue to flow in solenoid winding 29 throughout the period of use of the engine. In a similar manner, initiating current pulses via cable 20 causes electric current to flow in toroidal coil 26a, thereby inducing superconducting electric current flow in solenoid wound coil 27, the direction of the magnetic field thereof opposing the magnetic field of coil 29.

The rising magnetic field intensity generated by superconducting coil 23 reaches a magnitude at which its effect exceeds the critical magnetic field value at which the superconduction of coil 23 will cease and the electric current flowing in coil 23 will rapidly fall. During the time period immediately following the fall of superconductor current in the elements of coil 23, the initiated pulse applied to toroidal winding 26a continues to rise, applying a potential across the no longer superconducting elements of coil 23 to prevent their reverse conduction from producing a tendency of that coil's magnetic field to collapse as it is being transmitted from the rear of the engine. The magnetic field intensity of superconducting coil 25, being in opposition to the no longer supported field of coil 23, is directed parallel to the axis of the engine housing toward the rear and proceeds to transmit the magnetic field energy of coil 23 from the rear of the engine, at the same time suddenly extending itself rearward in the no-longer resisted rearward direction. The design and operation of coil 25 is such that, immediately following the transmission of the magnetic field energy of the field previously generated by magnetic coil 23, the electric current flowing in superconductors 29 produces a stable level of magnetic field intensity that no longer induces current flow in coil 23, thereby permitting that solenoid to return to its earlier state of readiness for the next initiating pulse from the electronic control system. All electrical currents flowing in the circuits of the electromagnetic energy propulsion engine are of a direct current kind, the only frequency involved being the time rate of production of direct current pulses of superconducting and conventional current flow used to produce the pulses of transmitted electromagnetic energy. It is the transmission of a succession of electromagnetic field energy pulses from the rear of the engine that yields the forward thrust on the engine and its vehicle. Electrical signals of various frequencies are required in certain parts of the associated equipment for the generation of power pulses for initiation and for use in telemetry sensing.

There is no secondary superconduction started in coil 23 superconductors 27 during the transmission part of the cycle, due to the fact that the magnetic field intensity produced by coils 24 and 25 in the region surrounding coil 23 exceeds its critical magnetic field intensity. The flow of electric current in the conventional conductor coils 22 and 24 and the fluxoids produced in the superconductors 27 and 29 of coils 23 and 25 act together to produce a small quantity of thermal energy during each cycle of operation of the engine. The thermal energy is removed by the magnetic refrigeration system 16 that operates from the magnetic pulse energy of the engine coils 22, 23, 24, and 25 in the usual manner.

When the first thrust cycle is completed, the next cycle is begun by the application of control pulse P3 to the conductors 26a of coil 22. The minimum repetition rate of the pulses of thrust generated by the engine is determined by the rate at which electronic control pulse P3 is supplied, the maximum repetition rate being determined by the design and construction of the engine assembly which determines its recovery time.

Figure 8:
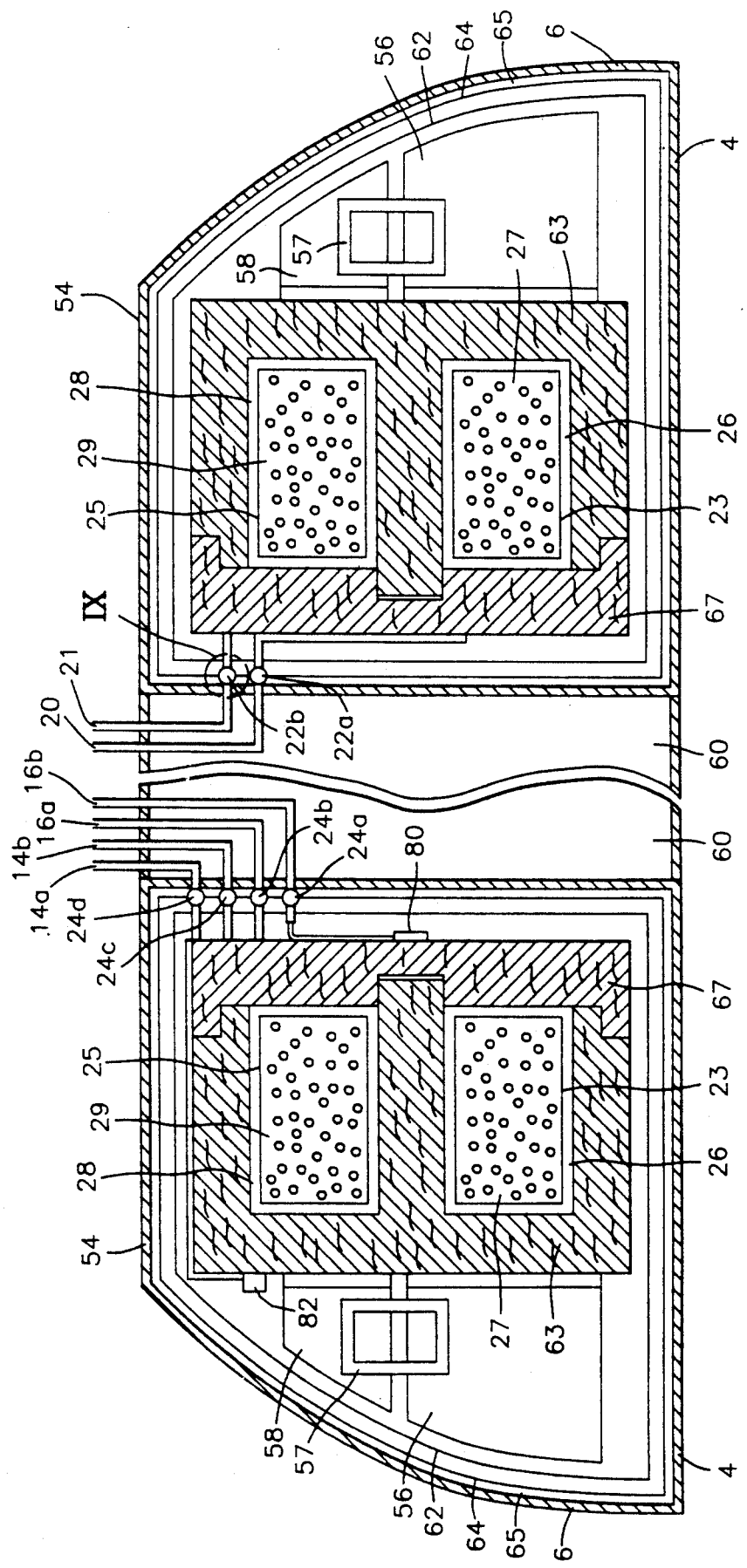
FIG. 8 is an enlarged partial cross-sectional view taken along line VIII—VIII of FIG. 6.
Figure 9:
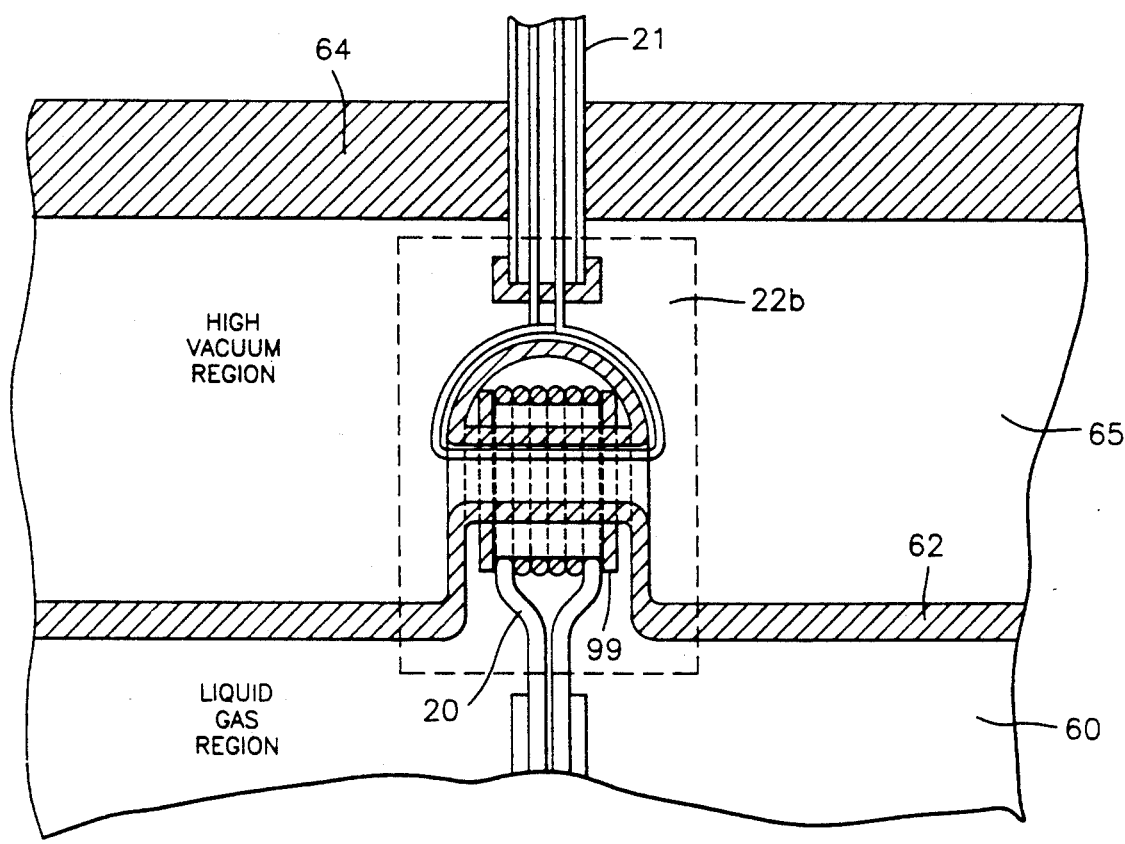
FIG. 9 is an enlarged cross-sectional view of the encircled part IX in FIG. 8 of the power pulse input transformers and the method of power input without breaching the thermal integrity of the liquid gas chamber.
Figure 10:
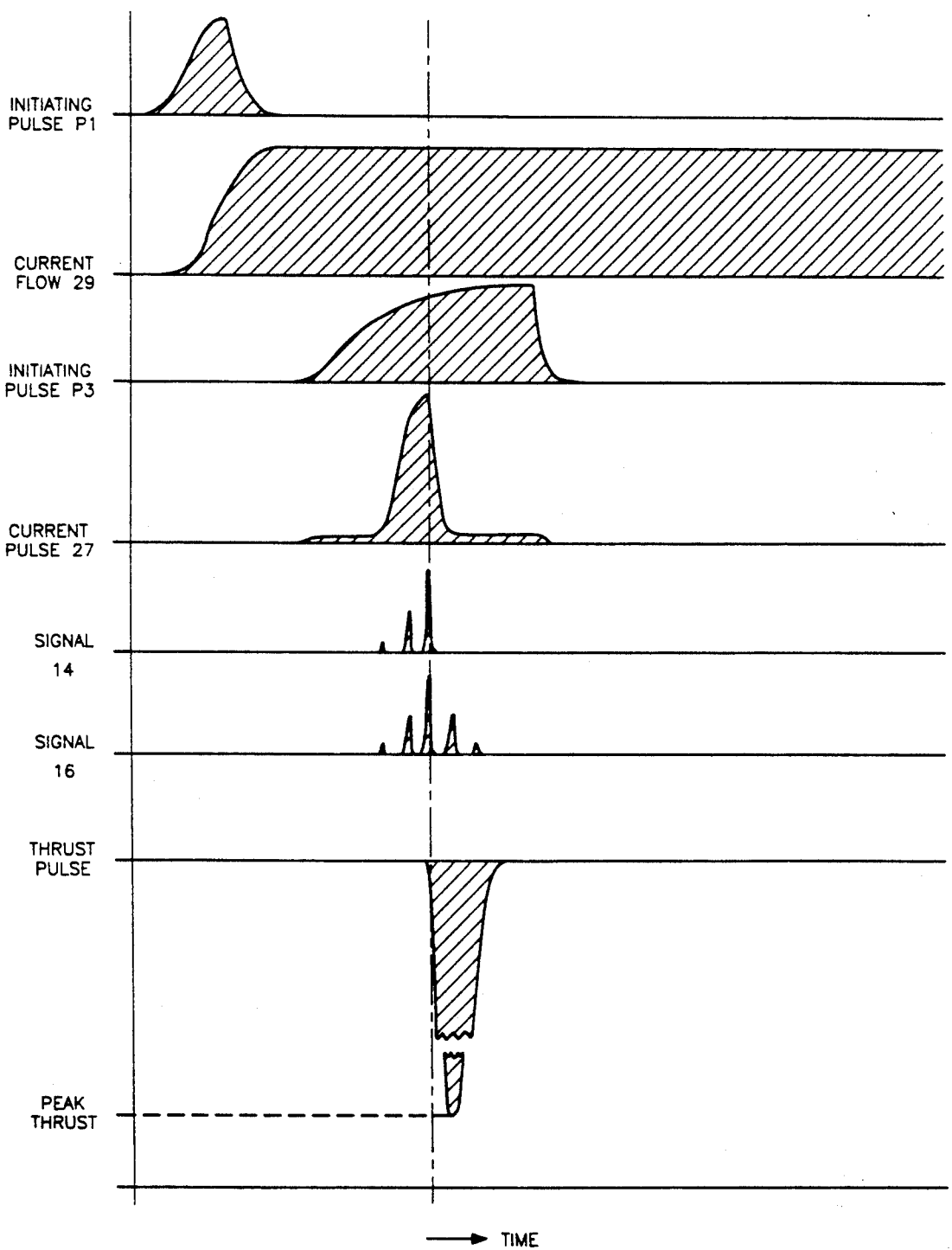
FIG. 10 is a graph showing the sequence of pulses used to initiate the superconducting states of the superconductors in those variations of the field generator of the embodiment of FIGS. 6-9. After initiation, the front field generator will normally continue in steady state conduction throughout the time of use of the engine. Also shown is the continuing pulse current flow of the pulse generator's initiating pulse during the time that the magnetic field energy of that generator is being transmitted from the engine and the pulse of thrust generated once each cycle of operation of the propulsion engine.
Figure 11:
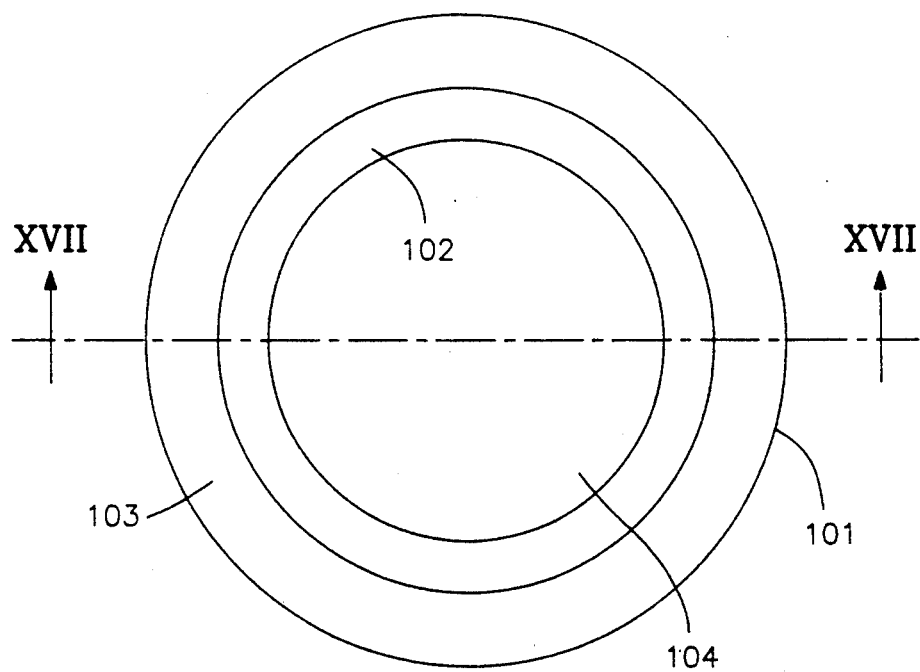
FIG. 11 is an end view similar to FIG. 1 of a further embodiment of the invention.

Referring to the embodiment of the invention shown in FIGS. 6 to 9 and to FIG. 10 showing the electric current pulses and forward thrust pulses, wherein like numbers are used for the same or similar parts, a housing enclosure is constructed of front wall portion 50, side wall portion 52 and rear wall 4. The engine occupies the space inside wall portion 52 and an intermediate wall 54 between wall portions 52 and 50. The auxiliary equipment, later described, occupies the space inside the front wall portion 50. In the form shown wall portions 52 and 54 are made of magnetic shield material capable of minimizing the transmission therethrough of magnetic fields Rear wall 4 is constructed of an electrically non-conducting material, such as high alumina porcelain, that is capable of permitting the transmission of magnetic fields through it to the outside of the engine housing. These wall portions are joined together by some means, such as suitable fasteners (not shown), or welding, to form the enclosure housing. The combined structure of the high alumina porcelain engine housing rear wall 4 and the shield side wall portion 52 and wall 54 serve together to provide a sealed compartment that is normally pressurized with a spark quenching material, such as sulfur hexafluoride gas.

Magnetic refrigeration equipment 56, 58 and 60 is positioned inside the liquid gas chamber in vessel 62 within side wall portion 52 and circumscribes the engine's magnetic field generator coils.

The liquid gas in vessel 62 cools the solenoid superconducting electrical current coils 23 and 25 having superconductor members 27 and 29, respectively, as well as their torodial windings 26 and 28 of the front and rear magnetic field generators, respectively, to the same superconducting temperature below 4.2° K. Liquid gas vessel 62 is enclosed within liquid gas shroud 64 containing liquid gas at a somewhat higher temperature than the temperature of the liquid gas that is contained in vessel 62, but still below 4.2° K. Shroud 64 is enclosed within high vacuum chamber 65.

Figure 23:
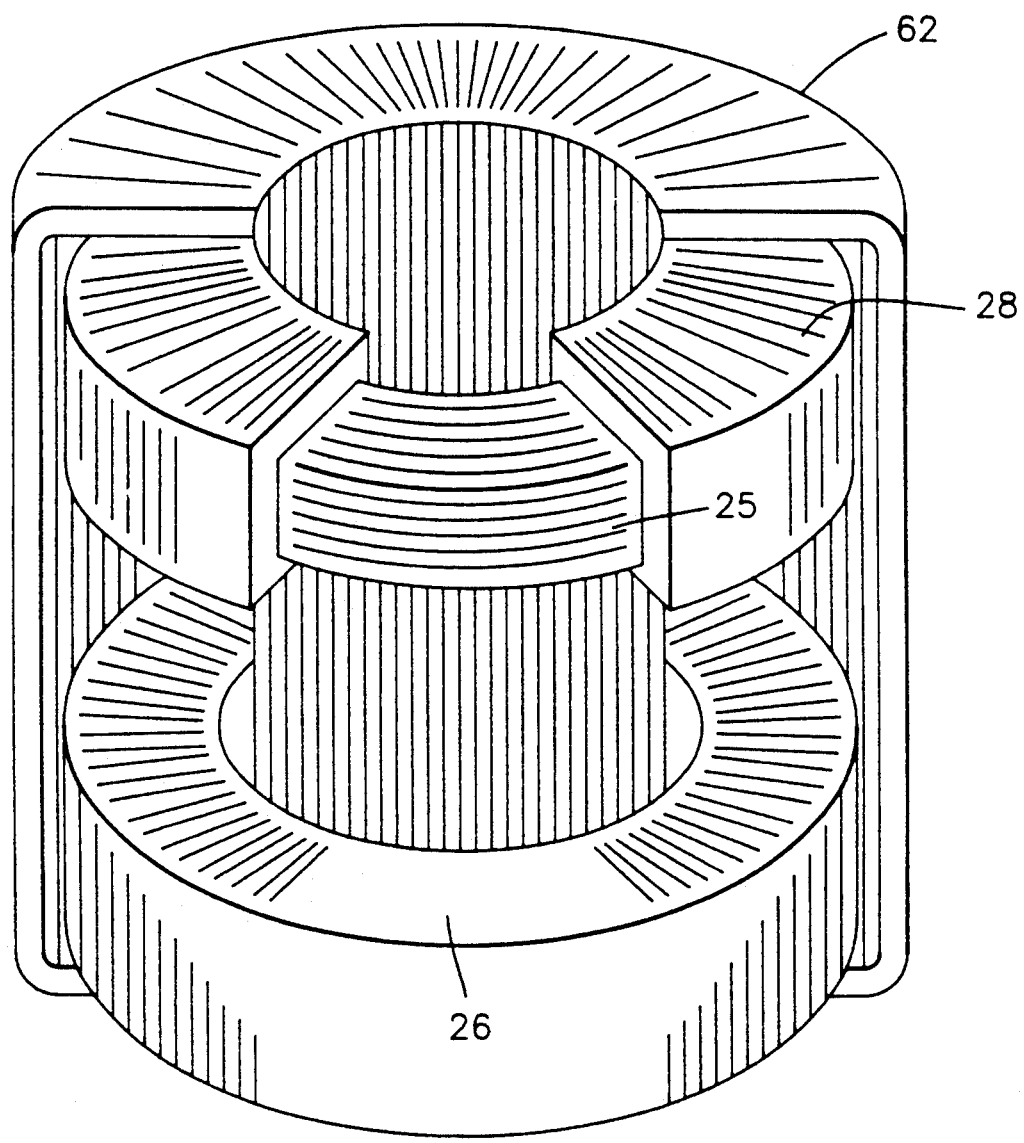
FIG. 23 is a perspective schematic view of the field generator windings within the liquid gas vessel.

Superconducting windings 26 and 28 are wound torodially around superconducting members 27, 29, respectively, as shown in FIGS. 8 and 23 and have the purpose of initiating current flow in the superconductors 27, 29 of coils 23, 25. Superconducting windings 26, 28 are wound so as to aid electric current flow in the superconductor members 27, 29, respectively.

The superconducting materials incorporated into front superconducting field generator members 29 are specially formulated and produced so that they have a much higher critical magnetic field at which they will drop out of superconduction than the corresponding but lower critical magnetic field intensity superconducting materials incorporated into the rear superconducting field generator members 27, the temperatures of the two superconducting field generator coils 23 and 25 being the same and the magnitudes of the current flowing in these coils producing opposing magnetic fields of similar intensities.

To provide superconducting windings, superconducting elements 27, 29 are fabricated metallurgically from suitable alloys of material, such as niobium-titanium, so that each alloy will possess the required operating characteristics for the several different superconducting wires used. There is a minimum of five different alloys required, one for each of the materials for the coils 26 and 28 and the superconductors 27 and 29 and for element 57. Toroidal coil 28 must have a critical magnetic field intensity that will be exceeded when superconduction is achieved in superconductors 29. The critical magnetic field intensity and the critical current level of elements 29 must not be exceeded for any of the operating conditions of the engine. The critical magnetic field intensity of elements 27 must be exceeded at that level which will produce the desired mass of magnetic energy in its field for use in producing propulsion. The critical magnetic field intensity of coil 26 must be exceeded at the time when the repelling magnetic field of coil 25 has transmitted the field of coil 23 through the rear wall 4 of the engine. Superconduction flow of electrical current in element 57 must begin as paramagnetic salt molecules of element 56 return to their random state with the cessation of current flow in superconductors 27, thereby opening the thermal gate for heat flow from the paramagnetic salt molecules of element 56 to the liquid helium in element 58 that is physically part of the liquid helium in vessel 62 and providing magnetic refrigeration for the engine.

Figure 8A:
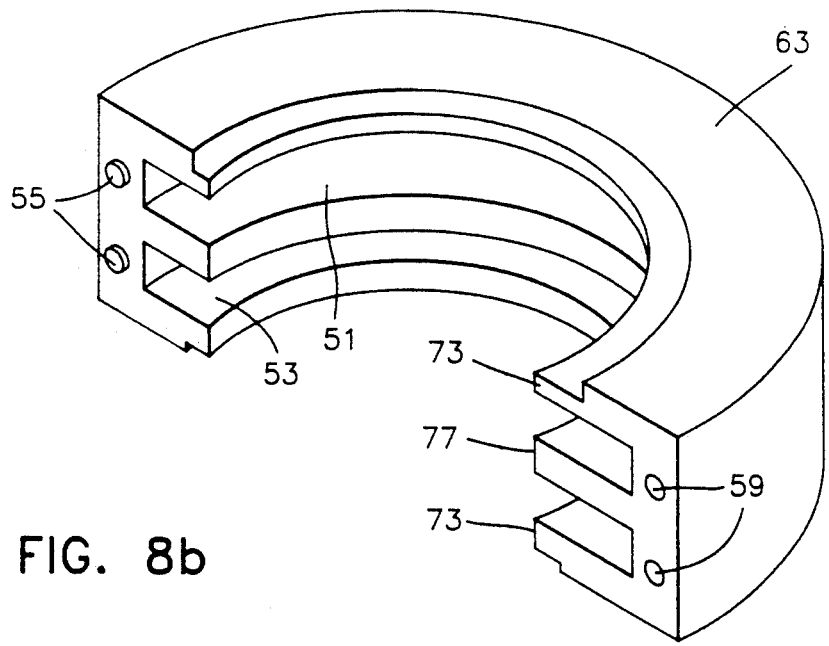
FIG. 8a is a perspective view of a semi-circular segment of the outer support member for the electromagnetic coils.
Figure 8B:
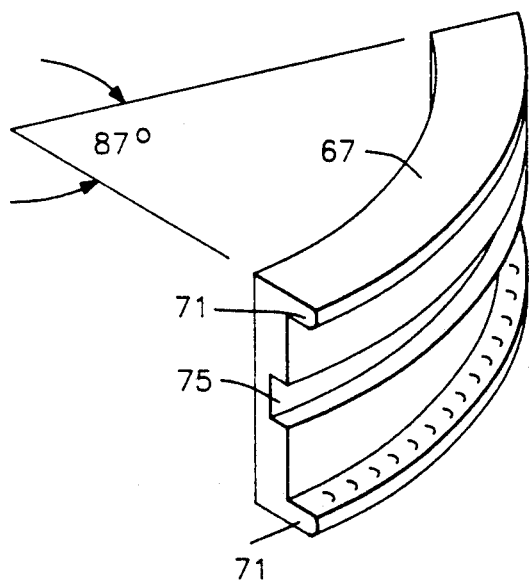
Figure 8C:
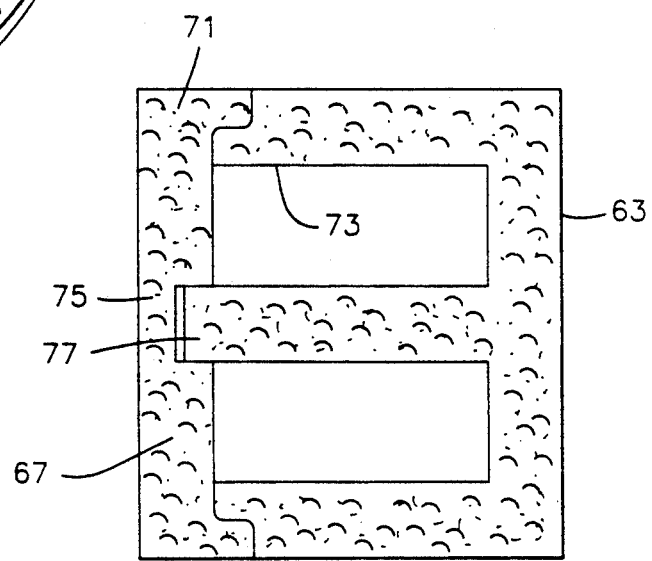
FIG. 8c is a cross-sectional view of the support members of FIGS. 8a and 8b when assembled.

Coils 23, 25, 26 and 28 are supported within the housing by support members 63, 67 made of suitably strong material, such as high alumina ceramic, which will not inhibit the flow of magnetic field energy. These support members are shown in detail in FIGS. 8a, 8b and 8c. Forward coil assemblies 25, 28 and rear coil assemblies 23, 26 are mounted in circumferential slots 51, 52, respectively, of outer support member 63. Support member 63 is formed of two identical semi-circular components, each having locating plugs 55 and locating holes 59 which interfit when the semi-circular parts are assembled together to form a complete outer support member 63. The inner support member is comprised of four identical segments 67, each having outer circular shape flanges 71, which cooperatively engage with flanges 73 of members 63, and curved slot 75 cooperatively engaging with the radially inner curved edge portion 77 of outer member 63 when the support members are assembled. The four segments 67 have side edges lying in planes which intersect substantially at the central axis of the support members and form included angles of approximately 87°. These support members are designed and constructed to maintain the electromagnetic field coils 23, 25 in position against the strong repelling force of the magnetic fields generated thereby. The four identical inner support members 67 brace the coils on their radially inner sides and retain them in the slots 51, 53 of the outer members 63.

Region 60 inside the engine enclosure housing is pressurized with a spark quenching gas, such as sulfur hexafluoride, to minimize the long term damaging effect of ionization and corona on the engine members.

Figure 7:
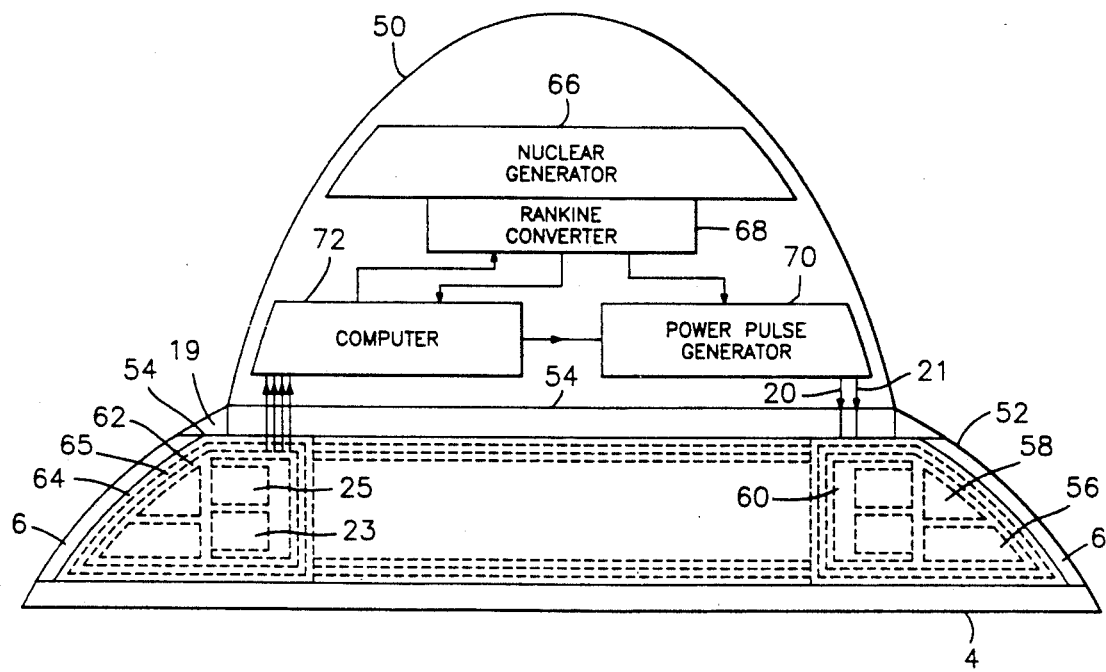
FIG. 7 is a side elevational view of FIG. 6.
Figure 7A:
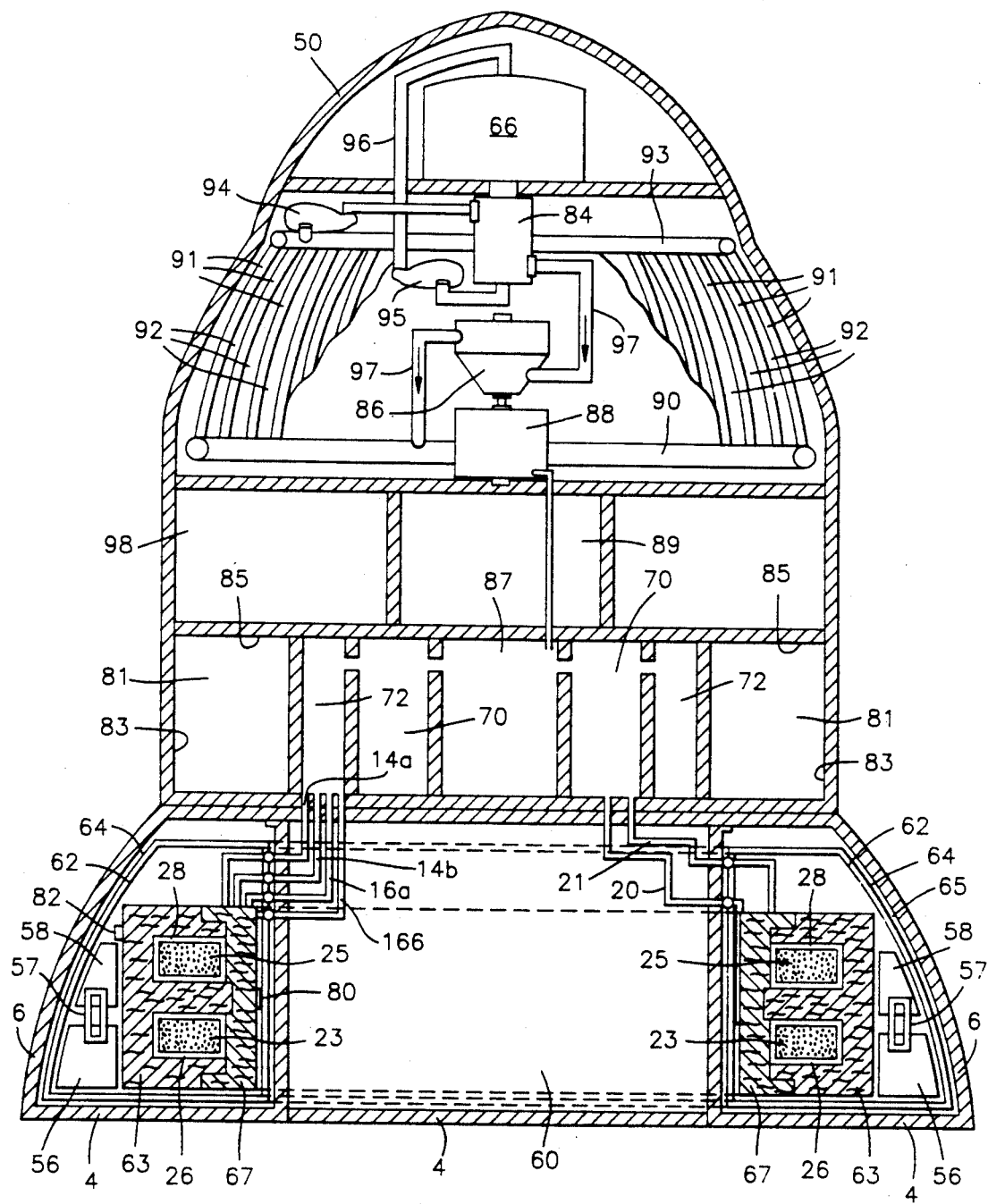
FIG. 7a is a schematic cross-sectional view of an embodiment similar to FIG. 7 showing components in greater detail.

In this embodiment, the power source, such as a nuclear generator 66, and a Rankine converter 68 are operatively connected together in a well known manner, such as shown in FIG. 7a described below. A power pulse generator 70 and computer 72 are connected together and also connected with the generator 66 and converter 68. These components are supported in some suitable manner, such as by a framework on which they are mounted, disposed within the cone shaped front portion 50.

The power pulse generator used to drive the several superconducting windings into superconduction can be a single generator with multiple outputs, or separate pulse generators all controlled by the computer. It will have low output impedance to match the low impedance of the superconducting windings and will deliver high current low voltage pulses to initiate the superconduction in the several windings.

A more detailed embodiment is shown in FIG. 7a wherein the electromagnetic engine in the rear part within shield walls 6 and 54 and rear wall 4 is the same, or substantially the same as that shown in FIG. 8. Associated equipment used in this embodiment includes a nuclear powered primary energy source which may be a nuclear reactor 66, for example, and a Rankine cycle energy converter 68. The converter 68 is comprised of a boiler 84, a turbine 86, an electric generator 88 connected to and driven by the turbine by a shaft, as is well known, and a condenser-radiator having a vapor manifold 90, tubes 91, radiating fins 92, liquid manifold 93 connected to tubes 91, suitable pumps 94, 95 and interconnecting pipes 96 for conducting primary fluid through the heat source 66 and boiler 84 and pipes 97 for conducting secondary fluid through a boiler 84, turbine 86, manifolds 90, 93, and tubes 91. FIG. 7a shows a framework forming compartments for storage, living quarters, and other component chambers for computers, power pulse generators and electrical control, for example.

An operational control computer 72 with manual override, and a power pulse generator 70 used to drive the magnetic field generators of the engine may be housed where shown. Cylindrical space 81 may be used as crew and passenger quarters in which wall 83 would be the floor when the vehicle is in flight and rotating about its central axis to give stability of orientation and for the generation of artificial gravity in space flights. Flight control instruments are suitably located in the crew area, such as at 85, and electrical power supply 87 operating from generator 88, as well known, supplies electrical energy throughout the vehicle. Compartment 89 is used to store spare tanks of helium and oxygen as well as a helium liquification plant. The adjacent compartment 98 is used for cargo.

FIGS. 7a and 8 show signal transformers 24a, 24b, 24c, 24d, with their respective cables 16b, 16a, 14b and 14a connecting the signal transformers to computer 72.

These transformers are constructed similarly to transformers 22a, 22b shown in greater detail in FIG. 9.

In the operation of the engine, the associated equipment shown in FIGS. 7 and 7a and 8 is operated to supply drive pulses P1 via generator control cable 21 to drive pulse transformer 22b having core 99 (FIG. 9) and hence to toroidal superconductor windings 28 of field generator 25. The rising electric currents flowing in toroidal windings 28 cause superconducting electrical currents to begin flowing in the superconducting winding of coil 25. The electric currents in superconducting winding 29 are caused to flow in a direction so that the magnetic field produced is directed toward the rear of the engine. The superconducting currents flowing in winding 29 that are established at the start of the use of the engine continue to flow in the winding throughout the period of use of the engine.

In a similar manner, and at a rate determined by the level of propulsion thrust desired, and as allowed by engine feedback signals from transducers 80 and 82 to computer 72, initiating current pulses P3 are applied by generator 70 via cable 20 to transformer 22a having core 99 and hence to coil 26 to cause superconducting current to flow in toroidal coil 26, thereby inducing superconducting current to flow in solenoid windings 27 of coil 23 in a direction so that the magnetic field produced opposes the magnetic field of the front magnetic field generator winding 29. The rising magnetic field intensity generated by superconducting winding 27 reaches the magnitude at which its effect exceeds the critical magnetic field intensity value at which the superconduction of windings 27 will cease and the electrical current flowing therein will rapidly fall. During the time period immediately following the fall of superconduction current in winding 27, the initiation pulse current applied to torodial winding 26 continues to rise, applying an induced potential across the no longer superconducting elements 27 to prevent their reverse conduction from a tendency of the magnetic field of coil 27 to collapse as it is being transmitted from the rear of the engine.

Each transducer 80, (FIG. 8) may be a magnetically compressed strain gauge that has its four internal resistive elements connected in a balance bridge arrangement to give it greater sensitivity. As the field generator 27 generates pulses of magnetic field energy in opposition to the normally existing powerful magnetic field of front mounted generator 29 the usually unbalanced bridge comes more into balance, a state that is reflected in the changes of resistance of its members, indicating to the computer the state of opposing force in the engine. The location of transducer 80 between the two field generators is important and the computer samples and senses the strain gauge resistance changes. Transducer 82 indicates temperature.

The magnetic field intensity of superconducting coil 25, being in opposition to the no longer supported field of coil 23 is directed parallel to the engine axis and toward the rear of the engine and proceeds to transmit the magnetic field energy of coil 23 from the rear of the engine, at the same time resuming its rearward extension in the no longer resisted rearward direction. The design and operation of windings 28 and 29 are such that immediately following the transmission of the magnetic field energy of the field previously generated by magnetic coil 23, the electric current flowing in the superconducting members 29 of coil 25 produce a stable level of magnetic field intensity that no longer induces current flow into adjacent coils, thereby permitting solenoid coil winding 27 to return to its state of readiness for the next initiating pulse from the control system.

All electrical currents flowing in the circuit of the electromagnetic energy propulsion engine superconductors are direct current, as opposed to alternating currents of radio or high frequency transmissions The direct current pulses of superconducted current are used to produce and transmit the field energy pulses. It is the transmission of a succession of electromagnetic field energy pulses from the rear of the engine that produces the reaction of the engine and the consequent forward thrust on the engine and the vehicle in which it is mounted. Electrical signals of various direct current or alternating current are used in certain signaling and control activities within the engine and its associated equipment. However, these do not constitute the resultant propulsion action of the engine.

There is no secondary superconduction started in coil 23 superconductors 27 during the transmission part of the cycle, due to the fact that the magnetic field intensity produced by coil 29 in the region surrounding winding 27 exceeds its critical magnetic field intensity. The flow of electric current in the copper or copper-nickel sheath into which the superconductor elements are extruded acts to produce a small quantity of thermal energy during each cycle of operation of the engine, which is removed by the magnetic refrigeration system located inside the cold chamber 62 that operates from the magnetic pulse energy of the engine coils in the manner described above regarding the first embodiment.

When the first thrust cycle is completed, the next cycle is begun by the application of control pulse P3 to the conductors of coil 26. The minimum repetition rate of the pulses of thrust generated by the engine is determined by the rate at which electronic control pulses P3 are supplied, the maximum repetition rate being determined by the design and construction of the engine assembly which determines the recovery time.

The assembly comprised of front walls, rear walls and rear window 4 is preferably shaped as an airfoil that may act as a flying vehicle inside of which are enclosed the electromagnetic energy propulsion engine and the auxiliary equipment. The entire vehicle depicted in FIGS. 7 and 7a will normally be made to rotate about its central front to rear axis, or geometric center line, at about 11 revolutions per minute, or a suitable rate that will provide orientation stability while inside the earths gravity field and provide a centrifugal force for the crew and passengers that is approximately equal to the earths gravitational pull.

An exemplary geometry of the embodiment of FIGS. 6-10 will now be described with dimensions. It is desirable to obtain in the engine a large value of inductance as that will give the respective winding a higher "Q" or quality factor and hence a higher impulse thrust per pulse. The quality factor or "Q" of a winding is equal to the ratio of the current that is flowing in the inductance to that flowing in the resistance of the winding when the winding is at resonance. Though the solenoid windings of the magnetic field generators are not operated in a resonance mode as direct current is used the ratio of inductance to resistance of the winding is important in obtaining rapid changes in operating conditions and hence an increased thrust.

FIGS. 7, 7a and 8 show the geometry chosen for the working embodiment described here. It consists of the two field generators wound as solenoids of approximately square cross section of windings, with the mean winding diameters being chosen as 305 centimeters, each winding having a 50 cm. × 50 cm cross section and a winding length of 50 cm. with 100 cm. spacing between windings. Each solenoid has a toroidal winding wound around its outside for the purpose of inducing in it superconducting current flows.

In practice, the engine may be envisaged as occupying a chamber region that comprises, in this example, a circular hollow ring having an outer diameter of approximately 366 cm. with the engine's solenoid windings having a mean diameter of 305 centimeters. Larger diameters up to 1830 cm. may be used The chamber is a compounded structure comprising three separate chambers positioned with an inner cold chamber held below 4.2° K., inside a shroud held below or only slightly above 4.2° K., and that in turn being inside a third chamber, the space between it and the shroud being evacuated to high vacuum for insulation purposes. The magnetic field generators and magnetic refrigeration system are mounted, with the high alumina ceramic winding form, inside the inner cold chamber.

The enclosure for this engine may take a variety of configurations and sizes, the air foil shown in FIG. 7a being one such configuration. Other suitable enclosures may include elongated fuselage type volumes with the engine and a nuclear power source being positioned at one end and the passenger compartment being at the other end.

The operating situation assumed for the engine is one where the vehicle that contains the engine is initially at rest. When the vehicle is moving the velocity affects the magnitude of the final thrust only to the extent that the vehicle velocity becomes appreciable part of the velocity with which the field energy is transmitted from the engine. In this initial operating condition the superconducting current has been induced into the solenoid conductors of the forward located driving magnetic field generator 25, and the pulse of current in the pulsed magnetic field generator 23 may be considered to be approaching that value that will yield the critical magnetic field intensity for the generator 23.

The engine has a primary power source in the form of, typically, a heterogeneous fissioning nuclear thermal energy generator equipped with a Rankine cycle convertor system, that supplies electrical energy to the entire vehicle. Operating from that source, a computer controlled power pulse generator drives the engine.

The driving magnetic field generator solenoid coil 25 first has superconducting current caused to flow through its conductors 29 with its magnetic field being directed along its axis toward the pulsed magnetic field generator 23, and the rear of the vehicle. Then the computer causes the power pulse generator to supply pulse current via the respective toroidal winding to the super conductors of the solenoid winding of the pulsed magnetic field generator 23. The magnetic field generated by the rear pulsed field generator opposes the field of the driving field generator and builds until it reaches a peak, determined by the designed critical magnetic field strength or intensity, $B_{c2}$ of the rear generator that causes the superconducting current flow in the pulsed field generator to suddenly cease and drop toward zero. It is at this point in the cycle, and over the next several microseconds, after the cessation of current flow in the pulsed field generator solenoid Winding that the peak magnetic field energy is repelled away and transmitted from the engine by the rearward directed field of the forward field generator Characteristics of each of the front and rear field generators that are predetermined by design and manufacture are used in the calculations. They include the number of turns of superconducting elements in the pulsed solenoid 23, the use of niobium-tin for the front superconducting elements of the front field generator solenoid winding and the use of niobium-titanium alloy for the superconducting elements of the pulsed field generator's solenoid winding, the front field generator's solenoid winding being produced with a critical magnetic field intensity of 18 to 18.5 Teslas while the rear pulsed field generator's solenoid winding is produced with a critical magnetic field intensity of 10 Teslas.

There are wound on the pulsed field generator's solenoid winding 8,640 turns of Cuprous-Nickel sheathed wire, each wire containing 14,701 superconducting elements, giving a total number (n) of $1.27 \times 10^8$ superconducting turns. Calculations will be carried out in CGS units, with conversions being made to other units as appropriate.

For the purpose of the calculations we shall assume that the engine's superconducting elements are being maintained at 4.2° K. and that the critical magnetic field intensity of those elements was established using that temperature. For the operation of the engine, the front magnetic field generator solenoid winding has a constant superconducting current flowing that produces a constant rearward directed magnetic field of some 9.5 to 9.8 Teslas intensity.

Figure 1:
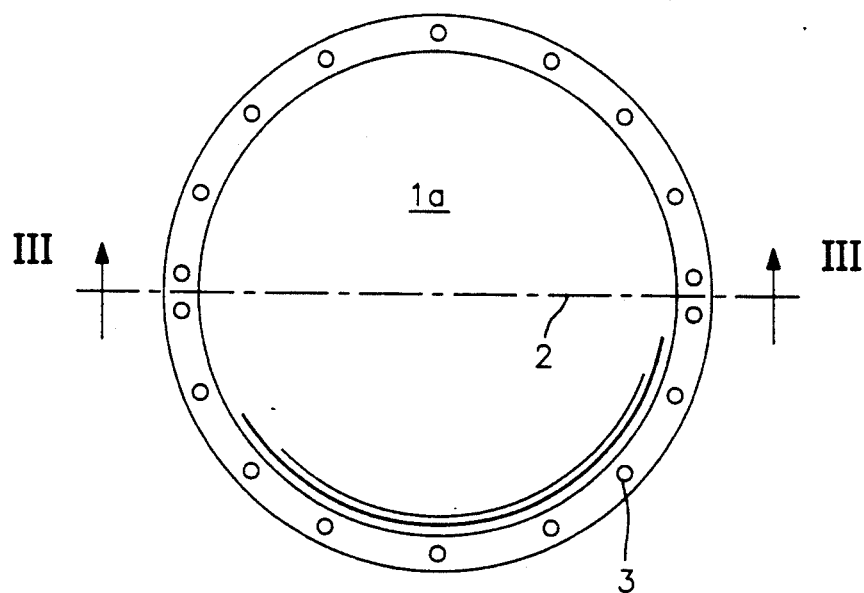
FIG. 1 is an end view of the engine enclosure showing its circular cylindrical configuration.
Figure 2:
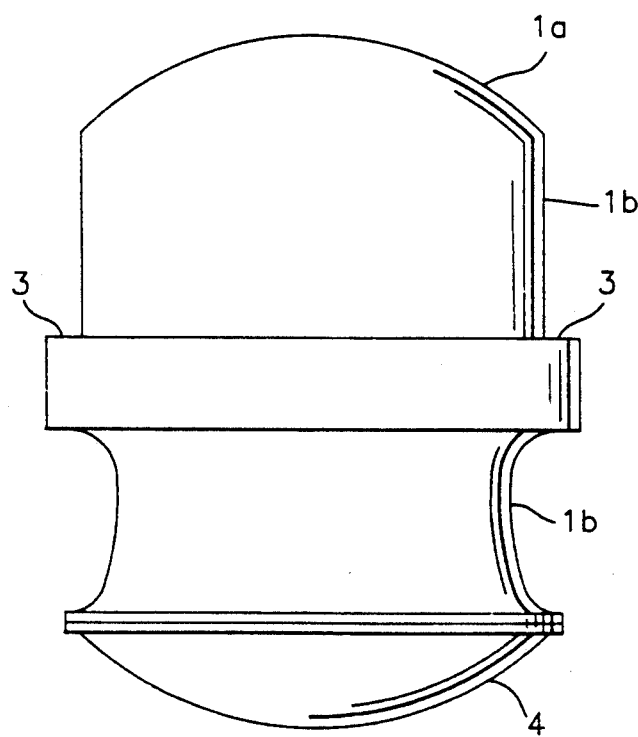
FIG. 2 is a side elevational view of the engine assembly in its enclosure.

From page 3 of the book, *Superconducting Magnets*, by Martin Wilson, published by Oxford University Press, second edition, 1989, we see from FIG. 1.2 that for a critical field intensity of 10 Teslas for the pulsed field generator using niobium-titanium superconductor elements the required electric current flow is $2.5 \times 10^8$ amperes per square meter. For these calculations we assume the cross section of the pulsed field generator's solenoid winding is 50 centimeters × 50 centimeters giving one quarter of a square meter. The required current flow would therefore be $6.25 \times 10^7$ amperes. The current flow per superconductor element is obtained by dividing $6.25 \times 10^7$ amperes by $1.27 \times 10^8$ superconductor turns, giving 0.492 amperes per turn. Though that current appears small one must take into consideration the extremely small cross section of each superconductor element, for which 0.492 amperes amounts to a high level of current density. Minor current flows will take place in the cuprous-nickel sheathing.

We may calculate the mass of the electromagnetic field energy that will be produced by the pulse of current flow in the rear pulsed magnetic field generator, and that will be available for transmission from the engine in producing the thrust, as follows;

$$\tfrac{1}{2} L\, I^2 = m\, c^2$$

Where:
  m = the mass of the energy
  I = $6.25 \times 10^7$ amperes
  c = $3 \times 10^{10}$ cm/sec
  L = solenoid inductance in Henries
  L = $(4\pi \times n^2 \times A)/(1 \times 10^9)$ $$L = \frac{(4\pi \times (1.27 \times 10^8)^2 \times 50 \times 50)}{(50 \times 10^9)}$$

$L = 1.01 \times 10^{10}$ Henries
Transposing for the mass, m we have;
$m = (LI^2)/(2c^2)$
$m = ((1.01 \times 10^{10})(6.25 \times 10^7)^2)/2 \times (3 \times 10^{10})^2)$ grams
$m = 2.19 \times 10^4$ grams
$m = 21.9$ kilograms We will need the value of the magnetic field in Oersteds in order to find the velocity with which the field energy is transmitted away from the engine. We may find the field, H as follows;

$$H = (4\pi \times n \times I \times \cos\Theta)/(10 \times l)$$

Where:
$n = 1.27 \times 10^8$ turns
$I = 0.492$ amperes
$\cos\Theta = 0.953$
$l = 50$ cm. Winding length $H = (4\pi \times 1.27 \times 10^8 \times 0.984 \times 0.953)/(10 \times 50)$
$H = 2.99 \times 10^6$ Oersteds We will also need to know the field strength in volts per meter to calculate the velocity with which the energy is transmitted from the engine. The voltage per meter E is given by;

$$E = (BM/\mu S) = (T \times 120\pi)/(4\pi \times 10^{-7}) \text{ volts/meter}$$

$E = (10 \times 120 N_0)/(4N \times 10^{-7})$ volts/meter
$E = 3 \times 10^9$ volts/meter $3 \times 10^7$ volts/centimeter The velocity with which the massive field of electromagnetic energy is transmitted away from the engine is, assuming permitivity and permeability are unity $$V = (2c \times E \times H)/(E^2 + H^2) \text{ centimeters per second}$$

$V = (2 \times 3 \times 10^{10} \times 3 \times 10^7 \times 1.5 \times 10^6)/(3 \times 10^7)^2 + (1.5 \times 10^6)^2)$
$V = 2.39 \times 10^9$ centimeters per second
$V = 29,900$ kilometers per second
$V = 1.08 \times 10^6$ kilometers per hour We are concerned with two values of thrust, the peak thrust produced each pulse, and the average thrust over time. The peak thrust is designated by P while the average thrust is designated by $P_a$. They are calculated as follows;

$$P = m \times V$$

Where
$m = 21.9$ kilograms mass
$V = 2.99 \times 10^7$ meters/second $P = 21.9 \times 2.99 \times 10^7$
$P = 6.55 \times 10^8$ kilograms peak force per pulse
$P = 1.4 \times 10^9$ pounds peak force per pulse (using 2.2 lb. = 1 kg.)

If we assume a repetition rate of 0.001, i.e., one pulse of thrust is produced each millisecond, and if we assume that energy loss is negligible, we obtain an average thrust $$P_a = 1.44 \times 10^6 \text{ pounds force average}$$

It is important to know the peak force of repulsion that is produced between the driving and pulsed magnetic field generators during each cycle of pulse of operation of the engine. That figure may be obtained as follows $$F = (2I_1 \times I_2/100 \times d)$$

Where:
$I_1 = 6.25 \times 10^7$ amperes
$I_2 = (5.2 \times 10^9)/4$
$I_2 = 1.3 \times 10^9$ amperes (driving currents)
d = mean distance between coils
d = 100 centimeters $F = (2 \times 6.25 \times 10^7 \times 1.3 \times 10^9/1100)^2$
$F = 1.657 \times 10^9$ grams force
$F = 1.657 \times 10^6$ kilograms force
$F = 3.65 \times 10^6$ pounds force
$F = 1.6 \times 10^{12}$ dynes force The above force must be mechanically constrained during the operation of the engine or it will damage the engine's structure. Materials such as high alumina ceramic with 50,000 pounds per square inch tensile strength are adequate for the purpose.

The above average thrust of $1.44 \times 10^6$ pounds force may be compared with the thrust that is achieved in some of the more modern fighter aircraft engines as follows;

Gruman F-14 P&W TF-30-P-414A = 20,900 pounds thrust
MIG-29 Isotov RD-33 Engine = 18,300 pounds thrust
Sukhoi Su-27 Lyulka AL-31 = 27,500 pounds thrust
F-16 Falcon P&W F100-PW-200 = 25,000 pounds thrust With the maximum velocity calculated of 29,900 kilometers per second, the non-air breathing engine of this disclosure will make it possible for a space shuttle to operate without rocket assist and escape from the gravitational pull of the earth and also from any other planet in the solar system.

Referring to the embodiment of the invention shown in FIGS. 11 through 22, a cylindrical housing 102 is constructed of two equal semi-cylindrical halves, each half being constructed of high strength magnetic field shielding material, mounting protrusion 101 with mounting faces 103 and 103a surrounding the center of its periphery. The housing 102 is joined to magnetic field windows 104 and 104a along lines 105 and 105a, respectively, by ultra high strength methods so as to aid in resisting the extreme forces generated by electromagnetic repelling forces in zone 131 or 131a of FIG. 20 when the electromagnetic field of either generator 123 or 123a interacts in a repelling manner with the respective electromagnetic field of generator 125 or 125a during operation of the engine Generators 125, 125a, 123 and 123a are assembled on a common shaft 142 of high alumina ceramic material that is transparent to electromagnetic forces and of such dimensions and configuration to serve as a major contributor to the containment of the repelling forces generated. With the exception of the ferromagnetic cylindrical housing and the pressed iron cores of transformers 106, 107, 108 and 109, all efforts are made to exclude ferromagnetic materials from the interior construction of the engine.

Figure 12:
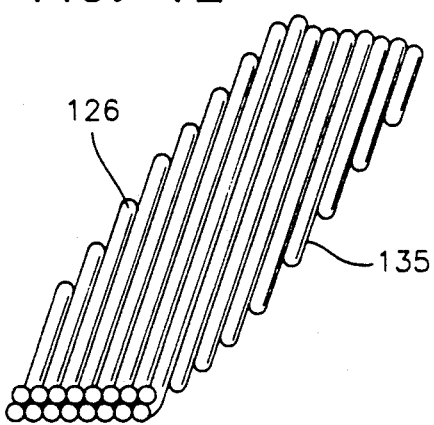
FIG. 12 is a perspective view of a part of an assembly of filaments of the pulse operated superconducting winding showing the manner of assembling the filaments.

FIG. 12 shows the manner of assembling filaments of the pulse operated superconducting windings 126 in the form of hollow tubular cables 135 of fully transposed windings for the purpose of pulse use and minimizing losses through self inductance, the tubular cable being then oxidized and flattened by rolling to yield the maximum filling factor for the purpose of getting the maximum number of windings in the minimum volume of space and thereby reducing the total engine mass.

Figure 13:
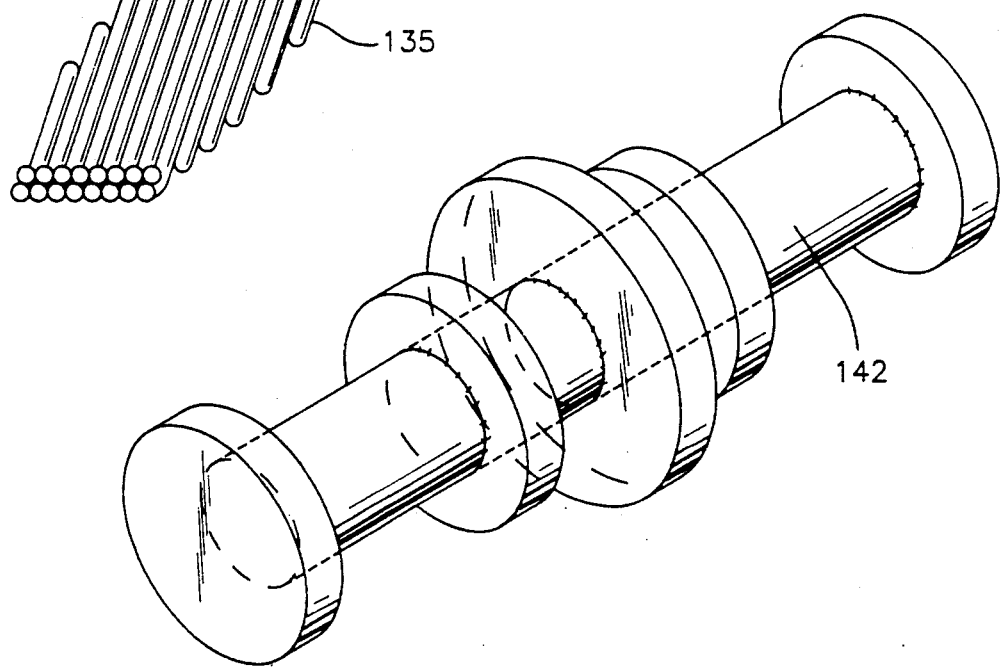
FIG. 13 is a perspective view of a high-alumina ceramic winding core or shaft upon which the windings of the electromagnetic field generators are assembled.
Figure 14:
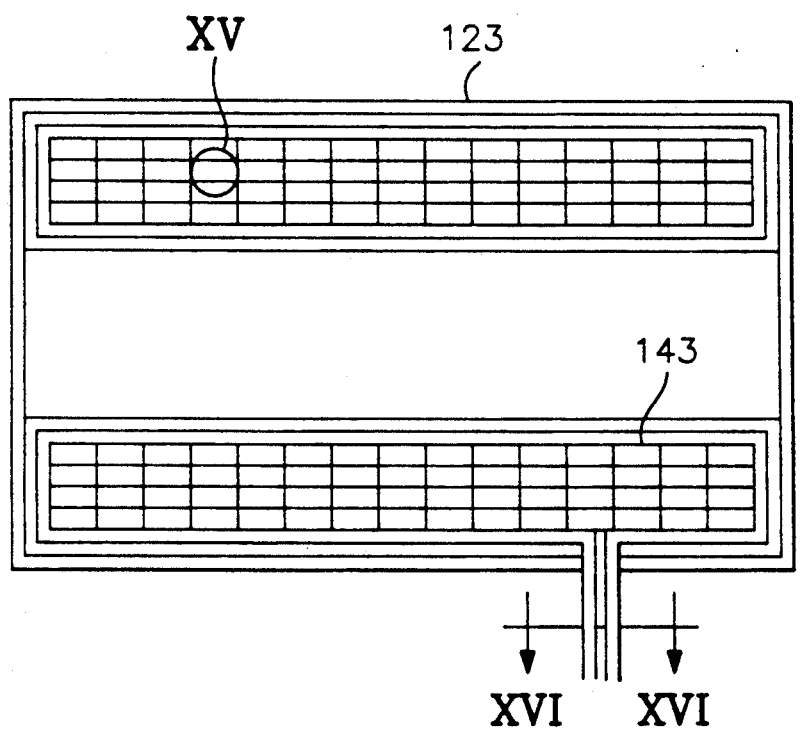
FIG. 14 is a cross-sectional view of one of the pulse electromagnetic field generator windings used in the field generators and showing the manner of achieving the maximum filling factor of winding filaments consistent with adequate cooling from liquid helium and the attainment of adequate mechanical strength, the rolled transposed filaments of FIG. 12 being combined with others similarly produced which are then sheathed in a copper alloy and rolled into a complete winding subassembly for final winding of the field generator coil. The torodial initiator winding is shown at 143.

FIG. 13 shows the high alumina ceramic winding core 142 upon which the windings of electromagnetic field generators 125, 125a, 123, and 123a are assembled. The two pulsed electromagnetic field generator windings 123 and 123a with toroidal windings 143 and 143a, one of which is shown in FIG. 14, are assembled on the same axis with and adjacent to the ends of the two centrally located main electromagnetic field generators, 125 and 125a with their toroidal windings 271 and 271a. The high alumina ceramic winding core 142 absorbs a major portion of the several million pounds of stress that is produced by the repelling forces generated between the two main field generators and between each main field generator and the adjacent end mounted pulse operated field generator.

Figure 15:
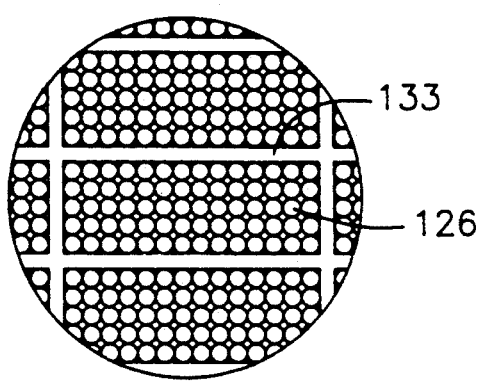
FIG. 15 is a cross-sectional view of the part encircled at XV in FIG. 14.
Figure 16:
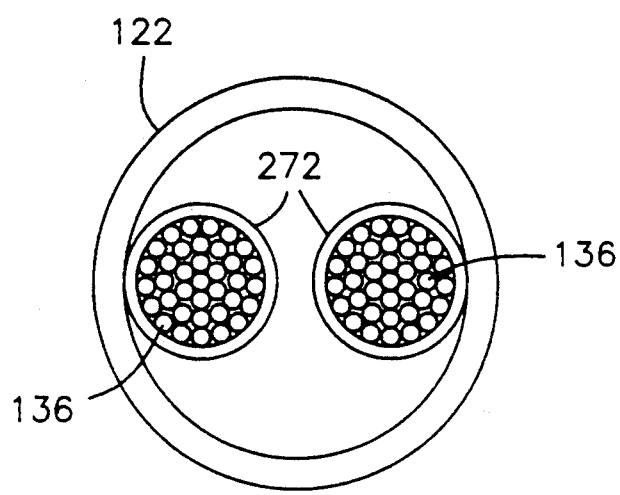
FIG. 16 is a cross-sectional view taken along line XVI—XVI in FIG. 14.

FIG. 15 shows in cross section details of the pulsed electromagnetic field generator windings used in field generators 123 or 123a and depicts the method of achieving the maximum filling factor of winding filaments 126 consistent with adequate cooling from liquid helium and the attainment of adequate mechanical strength, the rolled transposed filaments of FIG. 12 being combined with others similarly produced which are then sheathed in a copper alloy and rolled into a complete winding sub-assembly 133 for final winding of the field generator coil. Leads 122, or 122a, are shown in FIG. 16 with conductors 136 insulated by sleeves 272.

FIG. 20 shows a schematic cross section of the engine assembly depicting the location and numbering of the components of the engine, as well as its manner of connection via transformers to the external equipments that supply controlled electronic power initiation and control pulses to the engine. Also shown are the primary power source 113, with converter, for the engine and its vehicle, the computer 115 that controls the sequence of functions of the engine, the power pulse generator 114 that supplies power to the engine, and the sensor signal paths that feed data to the computer during the engine's operation. The transformers 106, 107, 108, and 109 carry pulse energy into the assembly and transformers 116a, 116b, 116c, and 116d carry signals out of the assembly, both types of transformers bridging the liquid helium chamber walls 138 without providing thermal energy paths into or out of the engine enclosure.

Figure 17:
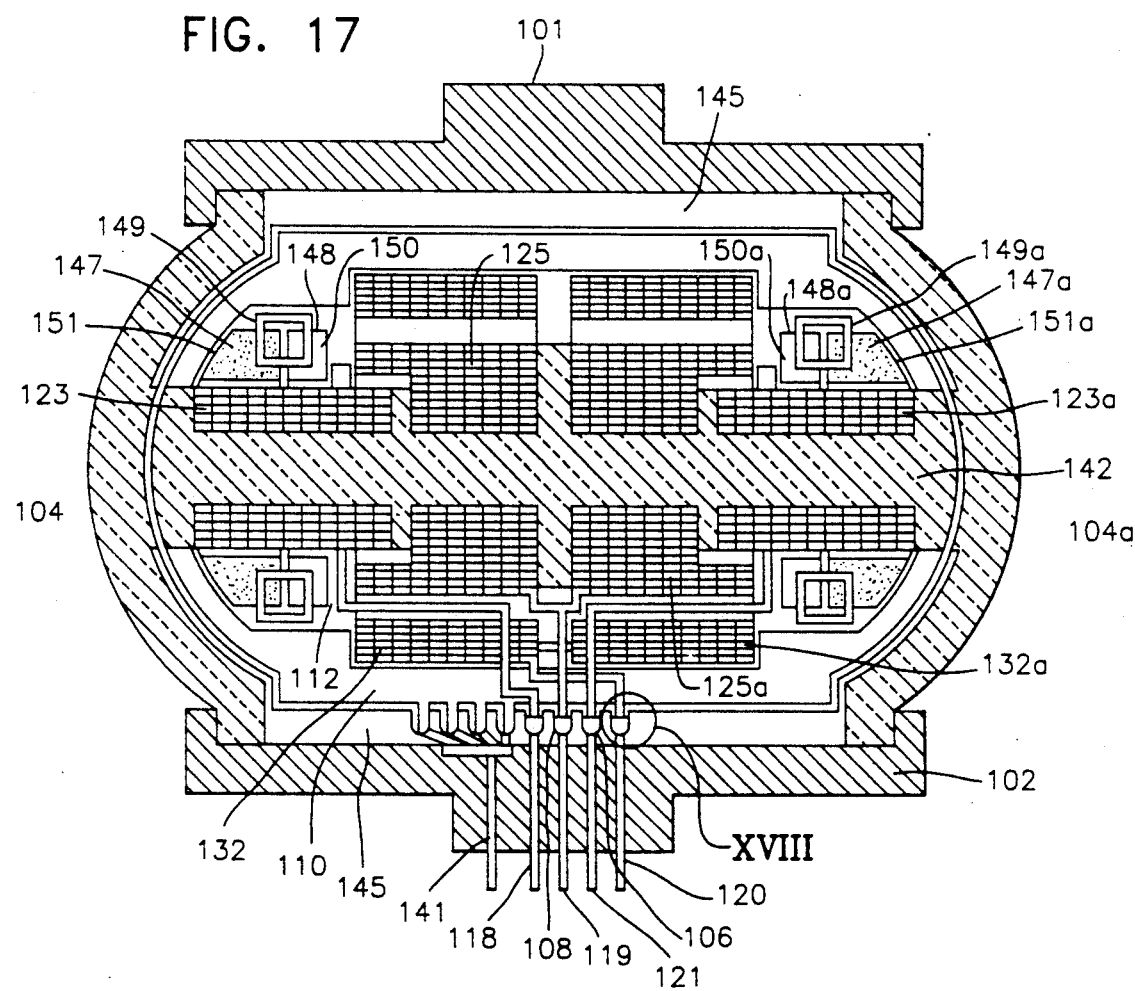
FIG. 17 is a cross-sectional view taken along line XVII—XVII in FIG. 11 showing different parts of the engine in their relative positions.
Figure 18:
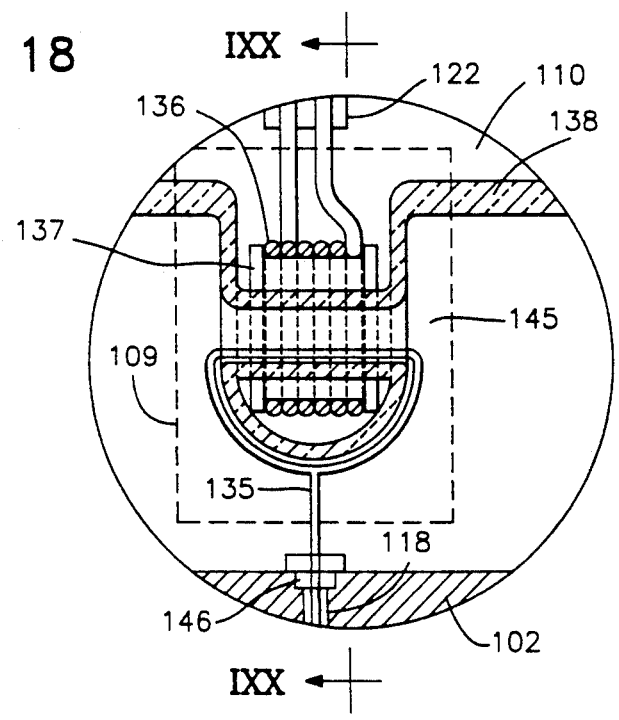
FIG. 18 is a cross-sectional view similar to FIG. 9 of the part shown encircled at XVIII in FIG. 17.
Figure 19:
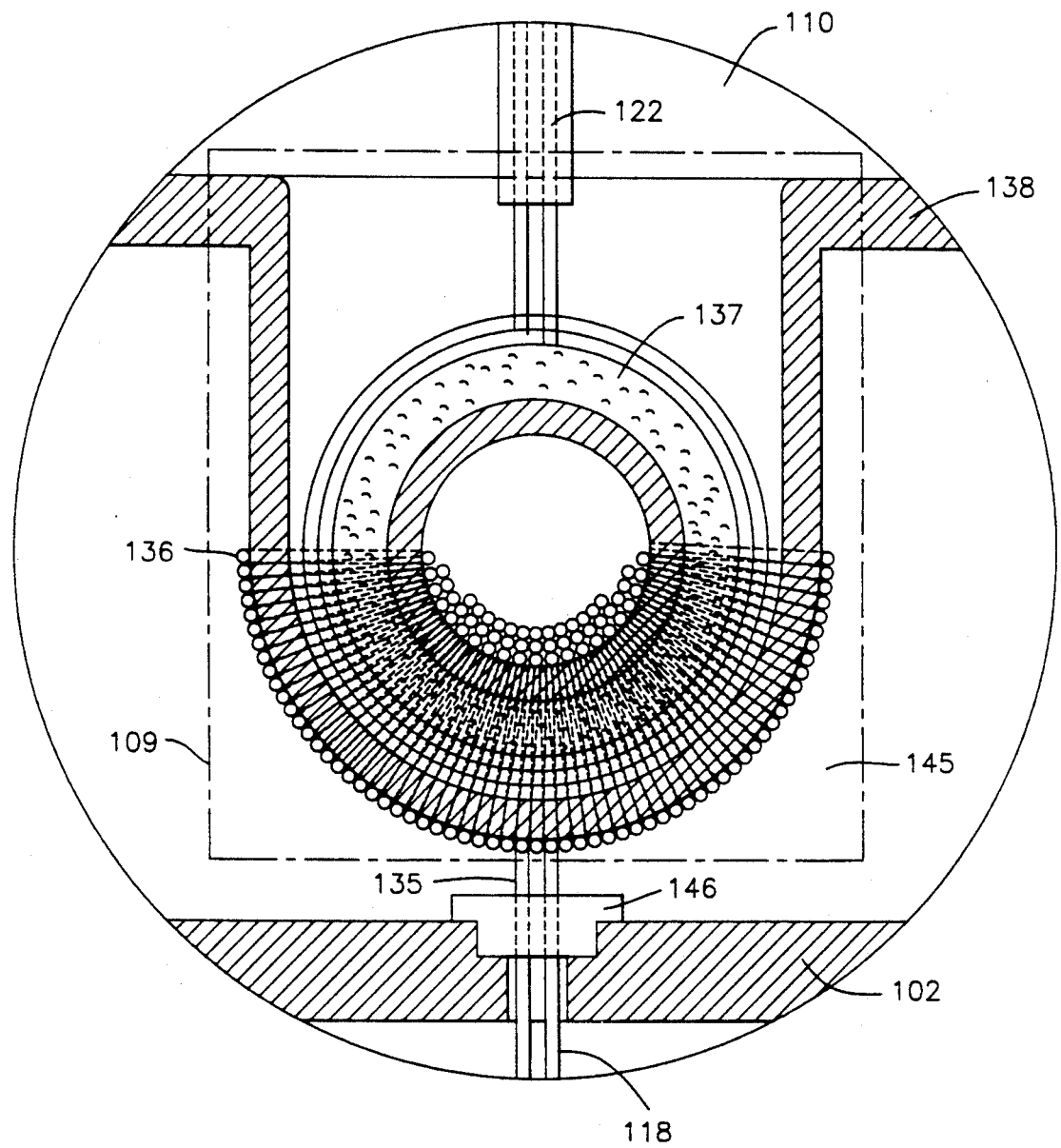
FIG. 19 is a cross-sectional view of the coil and associated components taken along line XIX—XIX in FIG. 18.

FIG. 17 shows a cross section of the engine to emphasize the different parts in their respective and relative positions. This view is to be compared to FIG. 20 for the numbering of other relevant parts of the engine, this view not being completely numbered so as to minimize confusion of part identification. Shown in ballooned view FIG. 18 of part of FIG. 17 (similar to FIG. 9) is a current transformer 109 typical of current transformers 106, 107, and 108, all used for feeding electrical power pulses into the engine without breaching the thermal integrity of the vessels holding liquid helium to cool the engine. Parts designated with a combination of a number and the suffix letter a are the exact counterparts at one end of the engine structure to similar parts at the opposite end of the engine assembly.

Figure 21A:
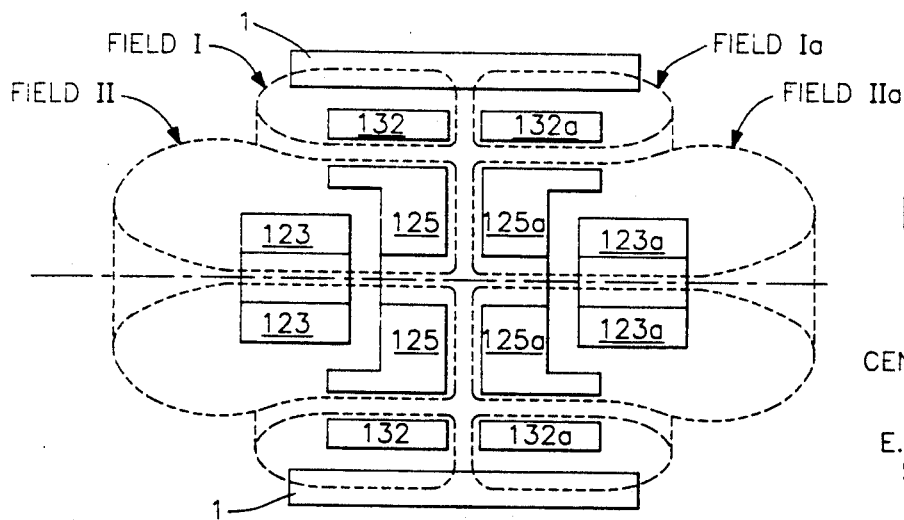
FIGS. 21a, 21b and 21c are diagrammatic views of the electromagnetic fields generated by the engine of the invention in three stages during a single cycle of operation, all views showing the constraining effect on the electromagnetic fields of the main field generators by the magnetic fields of the other generators.
Figure 21B:
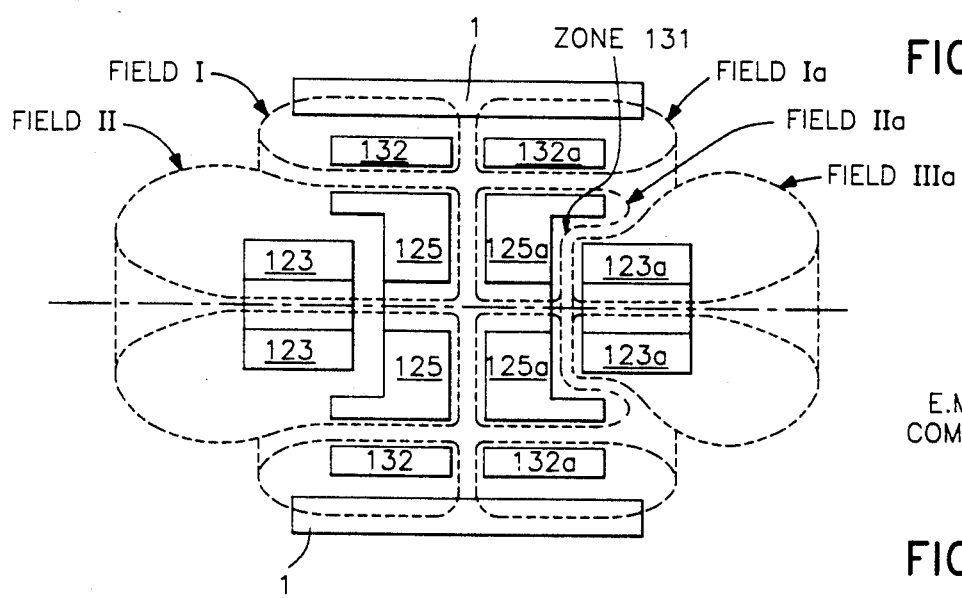
Figure 21C:
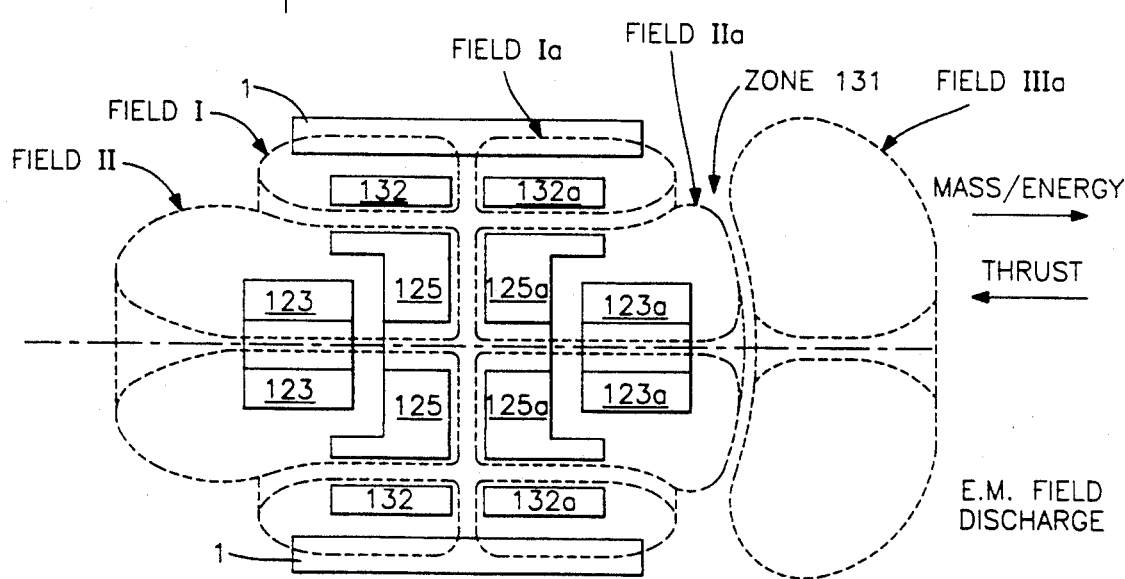

FIGS. 21a-c show diagrammatically the electromagnetic fields generated by the engine at three stages during a single cycle of its functioning, all figures showing the constraining effect on the electromagnetic fields II and IIa of the main field generators 125 and 125a by the magnetic fields I and Ia of field generators 132 and 132a. FIG. 21a shows the engine in a standby state of readiness when no thrust is being produced. FIG. 21b is a diagram of the engine's field generators during the compression phase of its operational cycle when the pulsed electromagnetic field generator 123a is near the peak of its field IIIa magnetic energy intensity and immediately prior to reaching its critical magnetic field level for the superconductor solenoidal coil 123a, at which point its superconducted electrical and magnetic currents drop suddenly toward zero, thereby, as shown in FIG. 21c, releasing its field for ejection from the engine by the repelling force of the electromagnetic field IIa of the main electromagnetic field generator 125a, at which time a pulse of potential of the appropriate polarity and magnitude is being applied to the solenoidal winding of electromagnetic field generator 123a to prevent reverse current heating of the generator 123a winding due to any tendency of field IIIa to collapse as it is being ejected.

Figure 22:
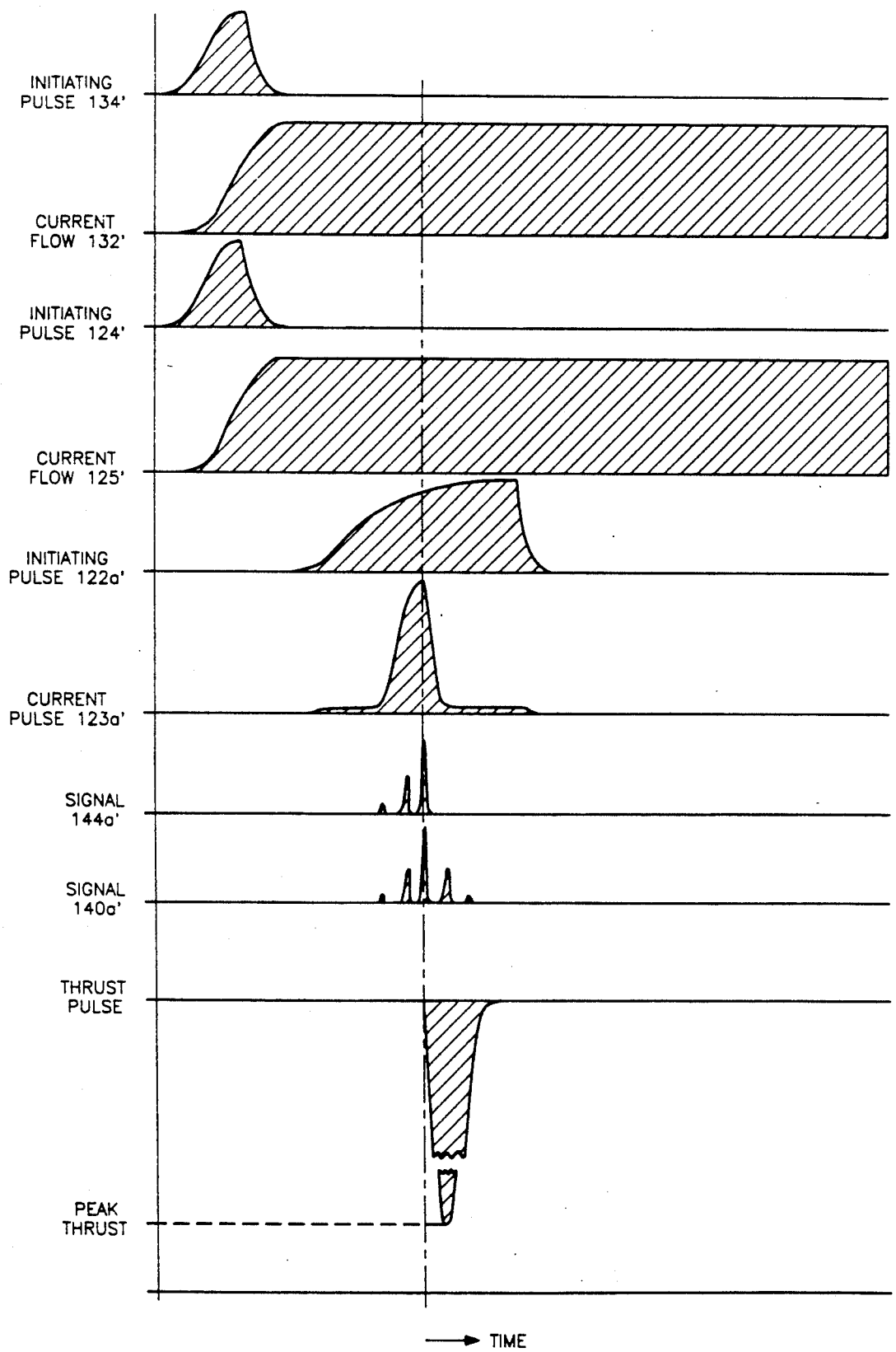
FIG. 22 is a diagram similar to FIG. 10 for the embodiment of FIGS. 11-21a, b and c.

FIG. 22 graphically shows the sequence of principal electrical current flows involved in the engine's operation during startup and during one cycle of its operation, plus the pulse of mechanical thrust that is generated when the extremely large quantity of electromagnetic energy transported by electromagnetic field IIIa is ejected from the engine by the slingshot effect of the repelling electromagnetic field IIa, the ejection being initiated by the collapse of electric and magnetic current flow in field generator 123a (similar for 123).

A number of the details and aspects of the invention may be varied from those shown in the figures supplied with the specification and still obtain some degree of thrust from the slingshot ejection of electromagnetic field energies. All such working variations are embodied in the concepts of the invention along with the means and methods for effecting such variations.

The engine is prepared for use by readying the thermal environment which requires the supply and installation of liquid helium into the inner vessel volume 112 and into the shroud volume 110 that are enclosed respectively, by vessel walls 138 and 139, and cooling the contents of those chambers to near zero degrees Kelvin. In addition, enclosing space 145 is evacuated and then sealed. Residual gas atoms remaining in the evacuated space 145 are freeze evacuated by the action of the low temperatures and surface preparation causing their deposition on the inner walls of the vacuum chamber. During periods of non-use of the engine, paramagnetic salts 147 and 147a in magnetic cooling vessels 151 and 151a, respectively, lie dormant awaiting activation by polarizing magnetic fields. Thermal reservoirs 150 and 150a are filled with liquid helium 148 and 148a, respectively, when the vessel 112 is filled with liquid helium. Superconducting thermal transport switches 149 and 149a lie dormant during periods when the engine is not readied for use, being active only when the pulsed electromagnetic field generators 123 or 123a are used.

Thermal transport switches 57, 149 and 149a are comprised of a loop of superconducting elements that pass through and are connected to a paramagnetic salt volume contained in components 156, 151, or 151a. The loop then passes across to a liquid helium heat sink located at 58, 150 or 150a where the superconducting elements pass through and are connected to the liquid helium. The three magnetic refrigeration systems depicted in the drawings are identified as 56, 57 and 58, and components 149, 150 and 151, and 149a, 150a, and 151a. Each group Comprises a refrigeration system that makes use of the spin-lattice relaxation mode of cooling. The spin-lattice relaxation takes place in the paramagnetic salt each time there is a reduction in the magnetic field strength to which the salt is subjected. The relaxation cools the salt and by the superconduction in the switch loop transfers heat energy to the liquid helium reservoir at successively lower temperatures. When the superconduction in the switch loop ceases as critical field strength is reached for the loop, the superconductor presents a high thermal resistance to the flow of thermal energy and the heat is isolated in the reservoir, allowing the spin-lattice relaxation to take place.

Operation of the embodiment of this invention shown in FIGS. 11-22 is as follows. The main power supply 113 is turned on, making available energy to the computer 115, power pulse generator 114, and switch panel 117. Computer 115 first interrogates the engine signal transducers 140, 140a, 144 and 144a by sending interrogation signals via leads 141 and transducer signal transformers, 116a, 116b, 116c, and 116d to ascertain the state of the engine. Transducer signal transformers 24a, 24b, 24c, 24d, 116a, 116b, 116c, and 116d are used to minimize the entry of thermal energy into the liquid helium chambers from outside the engine. Though transformer characteristics will change, they are all similar to FIGS. 9, 18 and 19. Other signals from external transducers may also be used but are not shown. When it has been determined that the engine is in a state of readiness for initiation, the computer 115, acting automatically or under the control of a human operator, closes switches 128 and 129 on switch panel 117 and then causes the power pulse generator 114 to supply initiating pulses 134' and 124' (See FIG. 22) to the current transformers 116 and 118 via input leads 121 and 119, respectively. Initiation pulses 124a' and 134a' induce superconducted electrical and magnetic current flows in leads 124 and 134, respectively, and thereby in the toroidal windings of field generators 125, 125a, 132 and 132a. The superconduction currents flowing in the toroidal windings of field generators 125, 125a, 132 and 132a cause superconduction currents to flow in the solenoidal windings of field generators 125, 125a, 132 and 132a, establishing continuous and steady electric and magnetic current flows such as current flows 132' and 125' shown in FIG. 22 and thereby setting up the opposing electromagnetic fields I and II, and Ia and IIa, as depicted in FIGS. 21a, b, and c. The electromagnetic fields of generators 125, 125a, 132 and 132a remain in operation throughout the period of use of the engine. When the superconducting currents generating fields I, Ia, II and IIa are flowing uniformly the computer 115 causes switches 128 and 129 to open. The computer 115 then closes switches 127 and 130 and causes the power pulse generator 114 to send neutralizing pulses along leads 120 and 118, respectively, and via current transformers 107 and 109, respectively, through leads 136 in ducts 122 and 122a, respectively to eliminate current flows in field generators 123 and 123a, respectively. The purpose of the neutralizing pulses is to stop any current flow that may have been induced by establishing the electromagnetic fields of generators 125, 125a, 132 or 132a.

The computer 115 then either receives a command signal from an operator or acts autonomously from such external sources as anti-collision signal producers, etc. to make the decision as to the direction and time to produce thrust by the engine. For purposes of this explanation it is assumed that the decision is made to produce thrust from right to left in FIGS. 17 and 20 or FIG. 21a, b, c, and on the engine assembly. Switch 127 remains in the open position and electromagnetic field generator 123 remains dormant during this period of operation of the engine. The computer 115 next causes switch 130 on switch panel 117 to close and then causes power pulse generator 114 to send initiating pulse 122a' (see FIG. 22) of electrical and magnetic currents around wires 135 on the primary of current transformer assembly 109 shown more clearly in FIGS. 18 and 19 (current transformer assemblies 106, 107, and 108 being dormant during this period). Wires 135, being wound toroidally about pressed iron core 137 and on which are wound superconduction turns 136, cause the pulse of power current to induce superconduction current flow inside the engine cold region without any lead-in wires breaching the controlled thermal environment. The initiating current pulse 122a' as shown in FIG. 22 is fed along superconducting wires 136 inside sheath 122 (FIG. 16) to circulate around the toroidally wound initiating winding of magnetic field generator 123a, thereby inducing a current pulse 123a' (FIG. 22) of superconduction current into the filaments 126 in their sheaths 133 of the generator 123a winding (FIGS. 14, 15, and 16).

The electromagnetic field IIIa of generator 123a is produced with a polarity so that it will repel the already existing field IIa of adjacent field generator 125a, causing the latter field to be compressed inward along the axis and shaft 142 of the engine, much as the compression stroke of a piston in an internal combustion engine. The stress of the repelling force, having a magnitude of some millions of pounds, is countered by a tensile stress that is established in the shaft 142 of the engine, and a similar tensile stress that is produced in the engine housing via the end windows, 104 and 104a of high alumina ceramic material and their mountings 105 and 105a to the engine housing. The superconduction currents of current pulse 123a' flowing in generator 123a cause its field intensity to exceed the predetermined critical magnetic field intensity of the turns of superconducting filaments 126 for that solenoidal winding, at which point in time the superconduction currents flowing in generator 123a coil cease flowing and the dynamic, high compressed electromagnetic field IIa of generator 125a is freed to eject, or transmit, the no longer supported electromagnetic field IIa of generator 123a from the vicinity of the engine assembly, the ejection being outward along the engine axis and through the end window 104a into outside space. Though the critical magnetic field intensity for the field generator 123a coil filaments 126 has been exceeded, the outside computer driven power pulse generator continues to supply pulse energy to the uncritical toroidal initiator coil windings 143 and thereby prevents reverse currents from the previously generated electromagnetic field of generator 123a from heating its windings. The extremely high energy electromagnetic field IIIa of field generator 123a will continue to exist in its uncollapsed state for some microseconds following the cessation of the superconduction current flow that generated it, providing an interval of time that is adequate for that field to be ejected. The momentum imparted to the ejected field of electromagnetic energy reacts on the engine structure to produce a pulse of thrust in the opposite direction.

Following the ejection of the electromagnetic field energy with its momentum, and after each pulse of thrust, the windings of field generator 123a ar made ready for the next cycle of operation. With no superconduction current flow in field generator 123a between pulses, and the electromagnetic field IIa of field generator 125a in its normal unrepelled state, the engine system is ready for the start of the next cycle of operation. The repetition rate of the engine, and hence the average total thrust produced, is a function of the computer triggering rate as well as the design and recovery times of the engine assembly and its external support equipment.

Each of the pulsed field generators 123 and 123a is wound with a sufficient number of turns of superconducting filaments of niobium-titanium alloy superconductor wire that is specially alloyed to reach its critical magnetic field intensity when the required energy content has been produced in the electromagnetic field of that field generator. Typically, field intensities commensurate with the current flows in the pulsed field generator coils of several million amperes are involved. The main field generators 125 and 125a are wound with sufficient numbers of turns of niobium-tin filament, each of which is alloyed so that it will not reach its critical magnetic field intensity during the operation of the engine, such that they will produce electromagnetic fields having repelling forces equivalent to or above that produced by the pulsed field generators 123 or 123a. The field generators 132 and 132a are wound with niobium-titanium superconductor filaments that will not reach their critical magnetic field intensity in their normal conditions of use, and yet will produce a magnetic field of sufficient strength to repel and contain the electromagnetic fields of generators 125 and 125a and cause those fields to be extended farther outward along the engine axis and possess additional dynamism. The superconducting windings of the toroidal initiating coils of the field generators are specifically designed and alloyed to operate in pulsing modes satisfactory to the needs of the engine.

The methods for and means of mounting and affixing components in position, and the choice of impregnating resins, sheathing materials, winding and annealing techniques, superconductor filament oxidation, direction of winding, and location of magnetic refrigeration components are all directed toward achieving optimum pulsed operation and yet presenting the minimum impedance to the passage of fields II, IIa, III and IIIa of FIGS. 21a, 21b, 21c as fields II or IIa eject fields III or IIIa, respectively.

Magnetic field interaction zones 111, 111a, 131 and 131a are shown in FIG. 20 at the regions where the magnetic fields of field generators 132 and 125, 132a and 125a, 125 and 123, and 125a and 123a, respectively, reach the greatest levels of magnetic repelling force during the operation of the engine. Zones 131 and 131a move inward along the engine axis with the build up of electromagnetic repelling force by field generators 123 and 123a, respectively, and later move outward with the ejection of field III or IIIa.

Inner liquid helium chamber 112 is separated from outer liquid helium chamber 110 by partition 139, while outer high vacuum chamber 145 is separated from the outer liquid helium chamber 110 by partition 138, walls 139 and 138 being connected at suitable places and by suitable means throughout their structures and being composed of such materials as high strength high alumina ceramics or other suitable materials so that they ar transparent to the passage of electromagnetic fields.

Figure 24:
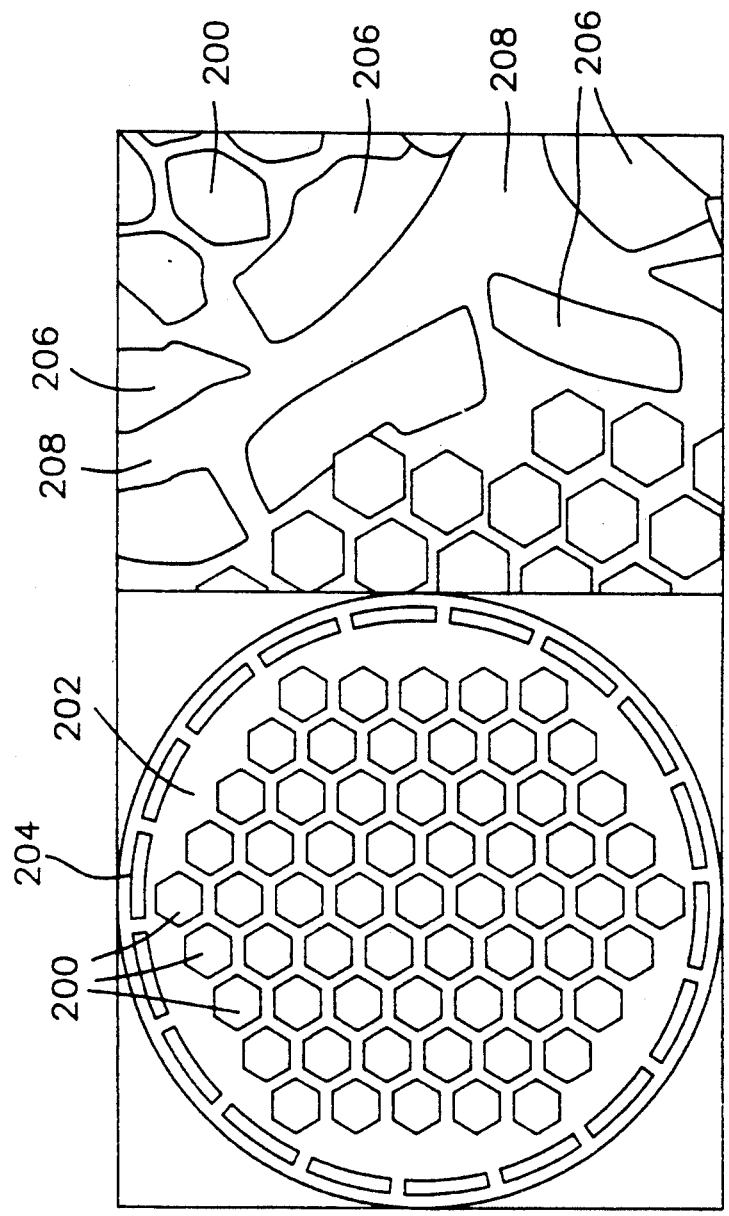
FIG. 24 is a cross-sectional view of the three-component composite used for the superconductors.

FIG. 24 is a cross-sectional view of the three-component composite of cupro-nickel sheathing and niobium-titanium superconductor elements used in the windings of the pulsed magnetic field generators of the engines of this invention. The left side of FIG. 24 shows NbTi filaments 200 in a copper-cupro-nickel matrix 202 and enclosed within a sheath 204. The enlarged view at the right of FIG. 24 shows the cupro-nickel barriers surrounding each filament and also subdividing the matrix, the copper being shown at 206 and the nickel being shown at 208.

FIG. 25 shows a further embodiment of the invention comprising a multi-engine large capacity vehicle generally shown at 250 constructed to use the engine of the invention. Forward thrusting engine 251, reversed thrusting engine 252, and side or upward thrusting engines 253, 254 and 255 provide propulsion for the vehicle. Primary power is provided for the vehicle and its engines by nuclear power plant 256 comprising components similar to those shown in FIG. 7a. Vehicle controls are located in control room 256. A vehicle atmosphere control facility and work shop 258 and elevators 266 service the vehicle. Power and access channel 269 distributes these services throughout the vehicle. Crew quarters 259, passenger rooms 260, 261 and 262, and cargo decks 264 are also provided. Windows in the air foil that are transparent to magnetic fields, such as windows or rear wall portions 4 described above, are shown at 265. Regions in each engine compartment that are pressurized with spark quenching gas are shown at 270.

It is to be understood that the foregoing description and accompanying drawings set forth preferred embodiments of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the full scope of the appended claims.

I claim:

1. An electromagnetic propulsion engine comprising:
   a hollow housing having a central axis, a forward wall, a side wall portion, and a magnetically transparent rear wall;
   a forward electromagnetic field generating means within said housing for generating a rearwardly directed magnetic field toward said rear wall and parallel to said central axis;
   a rearward electromagnetic field generating means between said forward generating means and said rear wall for producing a forwardly directed magnetic field parallel to said central axis and opposing said rearwardly directed magnetic field, said rearwardly directed magnetic field repelling forwardly directed pulses of said forwardly directed magnetic field generated by said rearward magnetic field generating means;
   means for providing controlled pulses of electric power having predetermined durations to said field generating means, so that sudden reduction of electrical current conduction in said rearward field generating means during continuing rearward directed magnetic field force of said forward magnetic field generating means causes a pulse of magnetic field energy of said rearward magnetic field generating means to be transmitted from the rear of the propulsion engine as said magnetic field of said forward field generating means is projected with a sudden action through said magnetically transparent rear wall, producing a rapid reduction of magnetic field intensity inside said housing and a corresponding combined forward thrust to said housing.

2. An electromagnetic propulsion engine as claimed in claim 1 wherein said housing comprises:
means for providing magnetic barriers for reflecting and guiding magnetic fields along inner walls of said forward wall and side wall portion; and
means for shielding objects and individuals outside of and in proximity to said forward wall and side wall portion and providing capacity for maximum transmission of magnetic energy through said rear wall as pulses of magnetic field energy having a major component of transmission direction along said central axis of said housing.

3. An electromagnetic propulsion engine as claimed in claim 1 and further comprising:
engine structural members in said housing for supporting said field generating means and constructed of materials having minimum impedance to the passage of magnetic field energies inside said housing and mechanical rigidity, strength and high temperature stability; and
means for minimizing the presence of internal ionized atmospheres in said housing.

4. An electromagnetic propulsion engine as claimed in claim 1 wherein:
said forward and rearward electromagnetic field generators comprise superconducting elements; and
said means for providing controlled pulses of electric power comprises means for initiating and terminating superconduction of electric current in said superconducting elements of said rearward field generating means while maintaining superconduction of electric current in said superconducting elements of said forward field generating means, and maintaining an electrical potential opposing reverse current flow in said rearward magnetic field generating means when the magnetic field energy of said rearward field generating means is being transmitted from said rear of the engine.

5. An electromagnetic propulsion engine as claimed in claim 1 wherein:
said forward and rearward electromagnetic field generating means comprise superconducting elements; and further comprising
means for providing commutation of said electromagnetic field energy generated by said rearward field generating means comprising said superconducting elements in said forward magnetic field generating means having the ability to withstand more intense magnetic fields before ceasing superconduction than said superconducting elements of said rearward magnetic field generating means.

6. An electromagnetic propulsion engine as claimed in claim 1 wherein:
said forward and rearward electromagnetic field generating means comprise superconductors; and
said superconductors of said forward electromagnetic field generating means continue conducting electric current at superconduction levels while said superconductors of said rearward electromagnetic field generating means are commutated between time periods of high superconduction current flow and periods of no current flow or low non-superconduction current flow.

7. An electromagnetic propulsion engine as claimed in claim 1 and wherein said means for providing controlled pulses of electric power comprises:
power source means;
control computer means connected to said power source means; and
power pulse generator means connected to said forward and rearward electromagnetic field generating means, said control computer means and said power source means for ensuring that said forward electromagnetic field generating means produces a rearward directed magnetic field force and said rearward electromagnetic field generating means produces a forward directed magnetic field force opposing said rearward directed field force, the direction of said field forces being measured along or parallel to said central axis of said housing.

8. An electromagnetic propulsion engine a claimed in claim 1 wherein:
said field generating means comprises respective superconducting means designed and fabricated of superconduction materials; and
said means for providing controlled pulses of electric power comprises electronic control means for generating a succession of pulses of thrust at independently determined frequencies and with independently determined times and magnitudes of superconductor current flow, thereby controlling the time averaged magnitude of the total thrust obtainable from the engine.

9. An electromagnetic propulsion engine as claimed in claim 1 wherein:
said forward and rearward electromagnetic field generating means comprise separate coils of superconducting elements;
means are provided for maintaining said superconducting elements at substantially the same temperature during operation; and
said superconducting elements used to generate said rearward directed magnetic field force have a higher critical magnetic field at which they will cease superconduction than said superconducting elements that generate said forward directed magnetic field.

10. An electromagnetic propulsion engine as claimed in claim 9 wherein:
said temperature maintaining means comprises magnetic refrigeration means comprising a first chamber containing a magnetically active salt and a second chamber containing a liquid gas, and a superconducting switch connecting said chambers in said housing for using a portion of said pulsed magnetic field energies of said magnetic field generators for cooling said liquid gas and removing thermal energies produced in the operation of said pulsed magnetic field generating means.

11. An electromagnetic propulsion engine as claimed in claim 1 wherein:
said housing comprises internal conformations inside of said side wall portion proximate the rear of said housing for enhancing the guidance and transmission of the magnetic field energies generated inside said housing to assist the movement and emission of magnetic field energies along the inside of said housing and through said rear wall.

12. A propulsion engine as claimed in claim 7 and further comprising:
   a liquid gas cooling chamber shroud in said housing and surrounding said field generating means;
   a high vacuum thermal isolation vessel in said housing and surrounding said liquid gas cooling shroud; and
   thermal isolating transformer means in said liquid gas cooling chamber shroud for transmitting electric power from said means for providing controlled pulses of electric power to said electromagnetic field generating means.

13. A vehicle for using the electromagnetic propulsion engine claimed in claim 1, comprising:
   a vehicle body incorporating said housing;
   means for causing said vehicle body to rotate about said central axis for imparting greater vertical stability to the orientation of said vehicle when flying in a gravitation field of an astronomical body; and
   means for controlling the rate of rotation of said vehicle body about said central axis so that a centrifugal force is applied to individuals inside said vehicle, said centrifugal force having a similar magnitude to gravitational attraction force of a planet on which said individuals normally live.

14. An electromagnetic energy propulsion engine system comprising:
   a cylindrical housing of ferromagnetic material;
   end windows in ends of said housing made of material that is transparent to the passage of electromagnetic fields;
   an engine axis substantially centrally disposed parallel to the central axis of said cylindrical housing;
   four superconducting electromagnetic field generating solenoid windings mounted end to end on a shaft and supported inside said housing comprising two center field generating windings and two outer field generating windings;
   a superconducting initiating and controlled toroidal winding for each of said four field generating solenoidal windings;
   fifth and sixth electromagnetic field generating windings circumscribing and surrounding in coaxial relationship said center field generating windings so that the electromagnetic field generated by each of said fifth and sixth field generating windings repels the field of the respective center field generating winding radially inwardly thereof for adding dynamism and axial extension to the field of said respective center field generating winding;
   said center field generating windings being designed to carry superconducting electrical and magnetic currents continuously during operation of said engine;
   said outer two field generating windings being designed and constructed to operate in a repetitive pulsing mode and alternatively to produce thrust in either direction selectively parallel to said central axis;
   liquid gas chamber means within said housing and surrounding said electromagnetic field generating windings;
   vacuum chamber means surrounding said liquid gas chamber means in said housing;
   an external electrical power source;
   an external control computer operatively connected to said power source;
   a power pulse generator means operatively connected to said power source; and
   switching means operated by said computer means for connecting electric power from said power source through said power pulse generator means and through said housing to said respective electromagnetic field generating windings for producing superconduction current generated electromagnetic repelling force to transmit highly intensive electromagnetic fields of energy selectively through either of said end windows by a slingshot effect so that a reaction to momentum imparted to said fields of energy produce pulses of thrust on the engine.

15. A propulsion engine system as claimed in claim 14 and further comprising:
   means for applying a pulse of potential of polarity to said pulsed field generator windings for momentarily inhibiting from collapsing and heating the respective generator windings producing energy in a momentarily unsupported electromagnetic field that is being repelled by a respective field.

16. A propulsion engine system as claimed in claim 14 wherein:
   said means for producing thrust comprises means for producing said thrust in either direction parallel to said axis.

17. A propulsion engine system as claimed in claim 14 wherein:
   said pulsed electromagnetic field generator is constructed to cease conducting superconduction currents at a predetermined electromagnetic field intensity to which it is subjected exceeding the critical magnetic field intensity for the superconductor winding thereof.

18. A propulsion engine system as claimed in claim 14 wherein:
   said pulsed electromagnetic field generator comprises superconducting elements; and
   means are provided for initiating and terminating on command the superconduction of electric and magnetic currents in said pulse operated superconducting elements.

19. A propulsion engine system as claimed in claim 14 wherein:
   means are provided for producing a strong electromagnetic repelling force between two electromagnetic fields, one of said fifth and sixth field generating windings producing said repelling force ceasing to conduct electric and magnetic currents at a point in time when continuing field energy of a respective center field generating winding sweeping through the pulsed field generating winding as the opposing field energy is being transmitted produces a pulse of potential across the winding of the pulsed field generating winding that opposes the induction of any reverse flow of currents in the pulsed field generating winding by tendency of the field that is being transmitted to collapse.

20. A propulsion engine system as claimed in claim 14 wherein said computer means comprises:
   a control computer;
   sensor inputs to said computer; and
   manual override inputs to said computer, so that time averaged thrust from a plurality of pulses of said thrust is determined by said control computer in response to a combination of programmed controlled information and said sensor inputs.

21. A propulsion engine system as claimed in claim 14 and further comprising:

magnetic refrigeration means mounted inside said housing for utilizing part of the energy from said electromagnetic field pulses for assisting in maintaining a liquid gas state of said coolant of the engine.

22. A propulsion engine system as claimed in claim 14 and further comprising:

spaces inside said engine housing and outside said liquid gas chamber means and said high vacuum chamber means; and spark quenching gas of pressurized sulfur hexafluoride filling said spaces.

23. A propulsion engine system as claimed in claim 14 and further comprising:

a plurality of power and signal energy input and output transformers having one winding mounted outside said liquid gas chamber means and a second winding mounted inside said liquid gas chamber means for maintaining a minimum of thermal energy transfer into cold regions of the engine within said liquid gas chamber means, and for providing for superconduction on said inside transformer windings constructed of superconducting materials.

24. A propulsion engine system as claimed in claim 14 and further comprising:

sensing devices mounted on said engine inside said housing for indicating temperature and the levels of force generated between propelling electromagnetic force-generating members and members providing said field energy; and means for connecting said sensing devices to said computer means.

25. A propulsion engine system as claimed in claim 24 wherein:

said force sensing devices comprise crystal strain gauges.

26. A propulsion engine system as claimed in claim 14, and further comprising:

pulse operated superconducting electrical coils mounted on said housing about peripheries of said end windows for producing radially inwardly directed electromagnetic force fields for altering the direction of thrust by acting o the propulsion producing electromagnetic fields transmitted through said end windows to provide directional control of a vehicle on which said engine is mounted.

* * * * *